US012731894B2

(12) United States Patent
Singh et al.

(10) Patent No.: US 12,731,894 B2
(45) Date of Patent: Sep. 8, 2026

(54) BEAM STEERING AND BEAM SHAPING IN REFLECTIVE METASURFACE UTILIZING LINEAR MOTION AND MECHANICAL ACTUATORS

(71) Applicant: Dell Products L.P., Round Rock, TX (US)

(72) Inventors: Tejinder Singh, Kanata (CA); Navjot Kaur Khaira, Kanata (CA)

(73) Assignee: DELL PRODUCTS L.P., Round Rock, TX (US)

(*) Notice: Subject to any disclaimer, the term of this patent is extended or adjusted under 35 U.S.C. 154(b) by 105 days.

(21) Appl. No.: 18/598,416

(22) Filed: Mar. 7, 2024

(65) Prior Publication Data

US 2025/0286276 A1 Sep. 11, 2025

(51) Int. Cl.
*H01Q 3/46* (2006.01)

(52) U.S. Cl.
CPC .................................... *H01Q 3/46* (2013.01)

(58) Field of Classification Search
CPC ........... H04B 7/04013; H01Q 15/0086; H01Q 15/148; H01Q 15/0066; H01Q 3/16; H01Q 3/46; H01Q 15/14; H01Q 15/002; H01Q 3/12; H01Q 3/01
See application file for complete search history.

(56) References Cited

U.S. PATENT DOCUMENTS

| | | | | |
|---|---|---|---|---|
| 9,640,867 | B2 * | 5/2017 | Behdad | H01Q 15/148 |
| 10,938,115 | B2 | 3/2021 | Urzhumov | |
| 11,990,671 | B2 | 5/2024 | Bailey et al. | |
| 2003/0043071 | A1 * | 3/2003 | Lilly | H01Q 3/2605 342/368 |

OTHER PUBLICATIONS

NPL—Continuously Tunable mm-Wave High Impedance Surface—Marina Mavridou, Konstantinos Konstantinidis et al., and Alexandros P. Feresidis—Senior Member, IEEE (Year: 2016) (Year: 2016) (Year: 2016).*

(Continued)

*Primary Examiner* — Dameon E Levi
*Assistant Examiner* — Gurbir Singh
(74) *Attorney, Agent, or Firm* — Amin, Turocy & Watson, LLP

(57) ABSTRACT

The technology described herein is directed towards a reconfigurable surface device that reflects an impinging electromagnetic signal, with a phase profile determined by curvature and vertical positioning of a flexible metallic ground plane beneath metallic resonating elements of the reconfigurable surface. The amount of curvature and vertical positioning forms different gaps between portions of the flexible ground plane and the respective metallic resonating elements above those portions, to determine the shape and direction of the reflected beam. In one implementation, four individually linear actuators and four vertical motors are mechanically coupled to the corners of the ground plane of a metasurface (panel). These actuators and motors are controlled to establish the phase profile, by determining the amount of curvature and vertical positioning of the flexible ground pane to shape and/or steer the reflected beam. The low-cost design can operate to shape and steer millimeter wavelength beams in wireless communication scenarios.

20 Claims, 31 Drawing Sheets

(56) References Cited

OTHER PUBLICATIONS

NPL—12, Dec. 2016—Dynamically Reconfigurable High Impedance and Frequency Selective Metasurfaces Using Piezoelectric Actuators—Marina Mavridou and Alexandros P. Feresidis,—IEEE Transactions on Antennas and Propagation (Year: 2016) (Year: 2016) (Year: 2016).*
NPL—Mar. 6, 2017—Wirelessly Automated Reconfigurable Antenna With Directional Selectivity—Youssef Tawk1 , Joseph Costantine2 , Fadi Makhlouf1, Maria Nassif1 , Leonel Geagea1 , and Christos G. Christodoulou3 , (Fellow , IEEE) (Year: 2017) (Year: 2017).*
NPL—Continuously Tunable mm-Wave High Impedance Surface—Marina Mavridou, Konstantinos Konstantinidis et al., and Alexandros P. Feresidis—Senior Member, (Year: 2016).*
NPL—12, Dec. 2016—Dynamically Reconfigurable High Impedance and Frequency Selective Metasurfaces Using Piezoelectric Actuators—Marina Mavridou and Alexandros P. Feresidis,—IEEE Transactions on Antennas and Propagation (Year: 2016).*
NPL—Mar. 6, 2017—Wirelessly Automated Reconfigurable Antenna With Directional Selectivity—Youssef Tawk, Joseph Costantine , Fadi Makhlouf , Maria Nassif , Leonel Geagea , and Christos G. Christodoulou , (Fellow, IEEE) ) (Year: 2017).*
Mouser.com, "MA4FCP200," https://www.mouser.com/ProductDetail/MACOM/MA4FCP200?qs=sGAEpiMZZMvzlsPcC61n6mK0VZ%2FmvpYc%252BB8AMtXWKnE%3D, Retrieved from the Internet Feb. 6, 2024.
Mouser.com, "M74HC595YRM13TR," https://www.mouser.com/ProductDetail/STMicroelectronics/M74HC595YRM13TR?qs=WHIX%252B%252B9%2FRwBw%252B7pGf3ngqg%3D%3D, Retrieved from the Internet Feb. 6, 2024.
Mouser.com, "ABX00080," https://www.mouser.com/ProductDetail/Arduino/ABX00080?qs=ulEaXIWl0c9tbG%2FHj5EzRA%3D%3D, Retrieved from the Internet Feb. 6, 2024.
Mouser.com, "A000079," https://www.mouser.com/ProductDetail/Arduino/A000079?qs=gMoqXxk%2F%2F5arlTJCT4KaEg%3D%3D, Retrieved from the Internet Feb. 6, 2024.
Mouser.com, "195200-237," https://www.mouser.com/ProductDetail/Ledex/195200-237?qs=byeeYqUlh0OpzXo5lnRdYQ%3D%3D, Retrieved from the Internet Feb. 6, 2024.
Ericcson, "5G Advanced: Evolution towards 6G," BNEW-22:024836 Uen, Jun. 2023.
Nokia Bell Labs, "Communications in the 6G Era," Sep. 9, 2020.
L. Subrt and P. Pechac, "Controlling Propagation Environments Using Intelligent Walls," in 6th European Conference on Antennas and Propagation (EUCAP), 2012.
N. Kaina, M. Dupre, G. Lerosey, and M. Fink, "Shaping complex microwave fields in reverberating media with binary tunable metasurfaces," Scientific Reports, vol. 4, pp. 1-7, Aug. 2017.
L. Dai, B. Wang, M. Wang, X. Yang, J. Tan, S. Bi, S. Xu, F. Yang, Z. Chen, M. Di Renzo, C.-B. Chae, and L. Hanzo, "Reconfigurable Intelligent Surface-Based Wireless Communications: Antenna Design, Prototyping, and Experimental Results," in IEEE Access, vol. 8, pp. 45913-45923, 2020.
C. Huang, C. Zhang, J. Yang, et al., "Reconfigurable metasurface for multifunctional control of electromagnetic waves", in Advanced Optical Materials, vol. 5, No. 22, 2017.
E. Baladi, M. Y. Xu, N. Faria, J. Nicholls, and S. V. Hum, "Dual-Band Circularly Polarized Fully Reconfigurable Reflectarray Antenna for Satellite Applications in the Ku-Band", IEEE Transactions on Antennas and Propagation, 1-1. doi: 10.1109/tap.2021.3090577, 2021.
PI-USA.US, "P-088 Round PICMA® Stack Multilayer Piezo Actuator," https://www.pi-usa.us/en/products/piezo-actuators-stacks-benders-tubes/p-088-round-picma-stack-multilayer-piezo-actuator-100821, Retrieved from the Internet Feb. 6, 2024.
PI-USA.US, "P-216 PICA Power Piezo Actuators," https://www.pi-usa.us/en/products/piezo-actuators-stacks-benders-tubes/p-216-pica-power-piezo-actuator-101555, Retrieved from the Internet Feb. 6, 2024.
L. Schmitt, X. Liu, A. Czylwik et al., "Design and Fabrication of MEMS Reflectors for THz Reflect-Arrays," Fourth International Workshop on Mobile Terahertz Systems (IWMTS), pp. 1-5, Germany 2021.
H. Kim, S. Oh, S. Band et al., "Independently Polarization Manipulable Liquid-Crystal-Based Reflective Metasurface for 5G Reflectarray and Reconfigurable Intelligent Surface," IEEE Transactions on Antennas and Propagation, Jun. 2023.
Singh, et al. "Beam Shaping in Reflective Metasurface Utilizing Mechanical Linear Actuators" U.S. Appl. No. 18/598,392, filed Mar. 7, 2024, 41 pages.
Singh, et al. "Beam Shaping in Reflective Metasurface Utilizing Mechanical Linear Actuators With Temperature Compensation" U.S. Appl. No. 18/798,193, filed Aug. 8, 2024, 47 pages.
Non-Final Office Action received for U.S. Appl. No. 18/598,392 dated Aug. 13, 2025, 33 pages.
Notice of Allowance received for U.S. Appl. No. 18/598,392 dated Feb. 24, 2026, 11 pages.
Notice of Allowance received for U.S. Appl. No. 18/798,193 dated Dec. 16, 2025, 10 pages.

* cited by examiner

2450

2850

BEAM STEERING AND BEAM SHAPING IN REFLECTIVE METASURFACE UTILIZING LINEAR MOTION AND MECHANICAL ACTUATORS

BACKGROUND

Reconfigurable intelligent surfaces, sometimes referred to as metasurfaces, redirect (e.g., reflect or refract) incoming electromagnetic beams in a fixed direction, by modifying the resultant beams in terms of phase, amplitude, and polarization. As such, reconfigurable surfaces are being investigated for use in the millimeter wave (mmWave) spectrum, where reflected beams can avoid obstacles that otherwise block a signal between a transmitter (e.g., a base station) and a receiver (e.g., a user equipment).

Some current electronically tunable designs depend on PIN diodes and/or varactors acting as switches between metallic patterns. Commonly available PIN diodes and varactors have a number of problems, however, including low maximum operating frequencies and other frequency-dependent characteristics such as narrow bandwidth, which limits their use at mmWave frequencies. PIN diodes and varactors offer high losses and parasitic effects that are particularly severe at mmWave frequencies, which is not desirable for high frequency performance. Further, there is only limited reconfigurability achieved using PIN diodes and varactors at mmWave operational range; for example, PIN diodes offer only either ON or OFF states, whereby only two reconfigurable states of phase are possible from using a single PIN diode in a metasurface. Still further, on-chip components like varactors/PIN diodes need to be soldered in each reconfigurable intelligent surface element. For low frequencies, when the individual cell size is large, this approach can still be employed, however at mmWave frequencies (30-300 GHz), soldering becomes a challenge with the shrinking cell size, making the device performance highly sensitive to the type and quality of the assembly and packaging process.

Current metasurfaces based on PIN diodes and varactors are also expensive. For example, in one metasurface of unit cells, for bias control each unit cell needs eight varactors and one operational amplifier (op-amp) integrated circuit to provide the desired voltage gain to actuate the varactors. Hence, for an 8×8 array, 512 varactors and 64 op-amps are required. For larger RIS arrays, the complexity of bias control will scale multifold.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
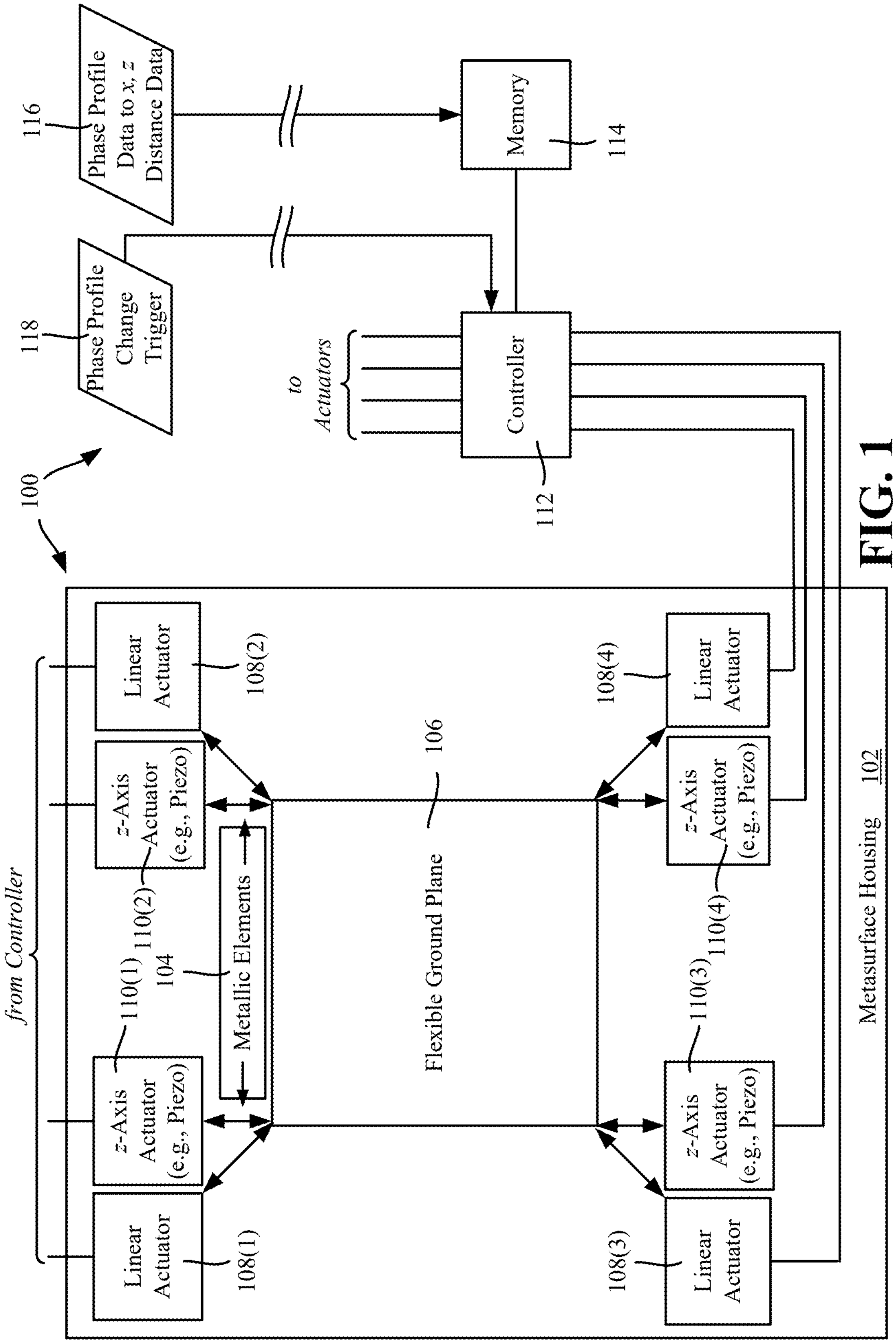
FIG. 1 is an example conceptual block diagram showing a reconfigurable surface (metasurface) in which linear horizontal motion actuators and/or vertical motion actuators (e.g., motors) curve and/or vertically move a ground plane to achieve analog and dynamic beam shaping and/or beam steering of a reflected electromagnetic signal, in accordance with various example embodiments and implementations of the subject disclosure.

The technology described herein is generally directed towards low-cost beam shaping using reflective metasurfaces (reconfigurable surfaces) that are coupled to mechanical linear actuators. The technology described herein is based on advanced metasurfaces with analog style beam shaping capabilities, which dynamically and accurately manipulate reflected signal beam shapes and beam directions.

In one implementation, four individually controllable linear actuators are mechanically coupled to the corners of a ground plane of a metasurface (panel). These four actuators enable a curvature phase profile, by determining the curvature of a flexible/moveable metallic ground plane, which allows a reflected beam to be shaped. Further, four additional individually controllable linear actuators, such as Piezo motors, can independently move the corners of the moveable metallic ground plane vertically up or down, which determines the tilt and/or some amount of curve of at least part of the flexible, metallic ground plane, which allows the reflected beam to be steered in a desired direction. In sum, this example implementation facilitates a scalable combined beam shaping and beam steering device for reconfigurable metasurfaces, using mechanical tuning with only four linear actuators and four piezo motors, regardless of panel size and/or number of unit-cells.

The technology described herein is based on an air cavity formed between a periodic resonating metallic surface on a dielectric substrate and a floating ground plane made using a flexible thin metal sheet. By employing linear motion actuators that support and provide linear force to the flexible thin metal sheet, e.g., inwardly and vertically up or down at each of its four corners, the amount of curvature and/or tilt angle of the metal sheet is adjustable, which can significantly alter the reflection phase response, including at mmWave operational frequencies around 28 GHz. This curvature alteration is driven by the actuators' precision movement, which compresses the flexible sheet towards inside of the cavity, whereby the curvature can be adjusted in analog style. The actuators can similarly be controlled in the opposite direction to decompress the flexible sheet. Further, the vertical driving actuators (e.g., Piezo motors) can influence the amount of curve, and/or further determine a tilt angle of all (or at least part of) the metal sheet. The amount of curvature and/or tilt angle of the flexible sheet determines the phase reflection, which is dependent on the variable distances (e.g., heights if positioned vertically) of the air gaps. Leveraging the linear motion actuators and providing bias to the actuators offers a gradient phase profile to the entire metasurface array, facilitating precision-tuning of the reflection characteristics, which results in beam shaping and/or beam steering.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in communications and reconfigurable intelligent surfaces in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. For example, "optimal" placement of a subnet means selecting a more optimal subnet over another option, rather than necessarily achieving an optimal result. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1 is a conceptual block depiction of an example system 100 including a metasurface housing 102, which, via metallic elements 104 and a flexible ground plane 106, reflects an impinging (incoming) signal, (an electromagnetic (EM)/radio frequency (RF) wave), such as near or within the millimeter wavelength, e.g., above 25 gigahertz). In one implementation, four linear actuators 108(1)-108(4) are mechanically coupled (e.g., at forty-five degrees) to the corners of the flexible ground plane 106 to force the flexible ground plane 106 a desired distance inwardly to curve central portions of the flexible ground plane 106 upward towards a center point of the metallic elements 104, or pull them back to create less (or no) curvature in the ground plane. As will be understood, inward or outward movement of the linear actuators 108(1)-108(4) curves the flexible ground plane 106 to a desired amount, resulting in differences in distances (gaps) between individual portions of the ground plane 106 and individual resonating metallic patterns of the metallic elements 104. The amount of curvature of the ground plane 106 changes the respective distances between respective portions of the ground plane 106 that are beneath their corresponding respective metallic elements 104. The amount of curvature thus changes the phase profile of the reconfigurable surface, resulting in beam shaping of the reflected signal.

Further, four actuators referred to as (e.g., piezo) motors 110(1)-110(4) are mechanically coupled to the corners of the flexible ground plane 106 to raise or lower any or all of the corners of the flexible ground plane 106 a desired vertical distance relative to the metallic elements 104, thus raising or lowering one or more of the corners (or the entire flexible ground plane 106). This can influence the amount of curve, and/or establish a desired tilt angle. The motors 110(1)-110

(4) can thus raise or lower any corner of the flexible ground plane 106 in a way that changes the phase profile of the reconfigurable surface, resulting in beam steering of the reflected signal. Indeed, the flexible sheet can be curved and/or tilted in part or as a whole, e.g., left-to-right, front-to-back, or a combination of both, relative to the metallic elements 104. Vertical movement, e.g., in unequal vertical amounts at the corners, can additionally change the curve to an extent of an otherwise curved flexible ground plane 106. As will be understood, upward or downward movement of the motors 110(1)-110(4) changes the distances between portions of the flexible ground plane 106 and the metallic elements to a desired amount, resulting in differences in distances (gaps) between individual portions of the ground plane 106 and individual resonating metallic patterns of the metallic elements 104; these different distances based on vertical-driven motion can be in conjunction with the different distances obtained via horizontal-driven curvature. Tilt and/or curvature resulting from operating the motors 110(1)-110(4), as well as curvature from operating the linear actuators 108(1)-108(4), thus can be combined to obtain a phase profile that results in desired beam steering and beam shaping.

In one or more example implementations, a controller 112 is configured to drive the linear actuators 108(1)-108(4) a desired distance (e.g., in what can be considered a +X or −X direction from the perspective of the actuators), to determine the amount of curvature of the flexible ground plane 106. The controller 112 is also configured to drive the motors 110(1)-110(4) a desired distance (e.g., in what can be considered a +Z or −Z direction from the perspective of the motors), to determine the height and/or tilt (and/or flex location) of the flexible ground plane 106. Electrical driving circuits or the like (not explicitly shown) can be used as needed to provide sufficient power to the linear actuators 108(1)-108(4) and/or motors 110(1)-110(4), e.g., for a controller that outputs only low voltage/low current signals that thus indirectly drive the linear actuators 108(1)-108(4) and/or motors 110(1)-110(4).

The controller 112 can be coupled to a memory 114 that contains the phase profile data (e.g., including the actuators'±X distances and motors'±Z distances) needed to curve, raise or lower, and/or tilt the flexible ground plane 106 the desired amount that results in a desired phase profile for the reflected beam. Multiple sets of phase profile data/actuator distances, such as arranged in lookup tables, may be written or downloaded to (e.g., block 116) and/or maintained in the memory 114 as needed, and a suitable phase profile trigger (e.g., block 118) can be used to instruct the controller 112 as to which set of phase profile data to use to correspondingly drive the linear actuators 108(1)-108(4) and/or the motors 110(1)-110(4) to beamform (shape) and/or steer the reflected beam. The reflected beam thus may be dynamically reshaped and/or re-steered in a relatively fast manner, based only on how fast the actuators can flex and/or move the flexible ground plane 106 to the specified phase profile data's amount of curvature, height and/or tilt.

Figure 2:
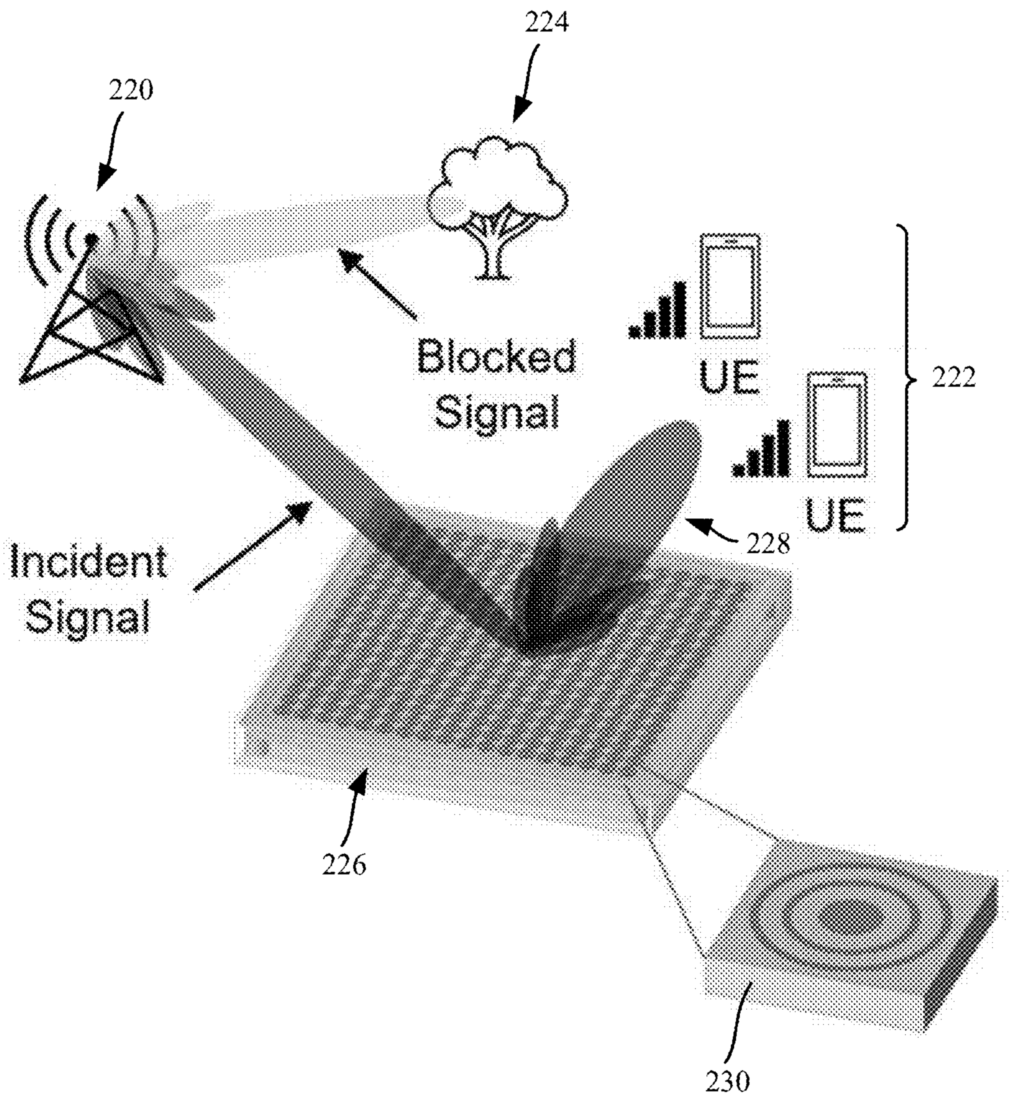
FIG. 2 is an example representation of one use-case scenario in which a reconfigurable surface shapes a broader, lower-gain beam (relative to FIG. 3) to provide coverage to nearby user equipment devices, in accordance with various example embodiments and implementations of the subject disclosure.
Figure 3:
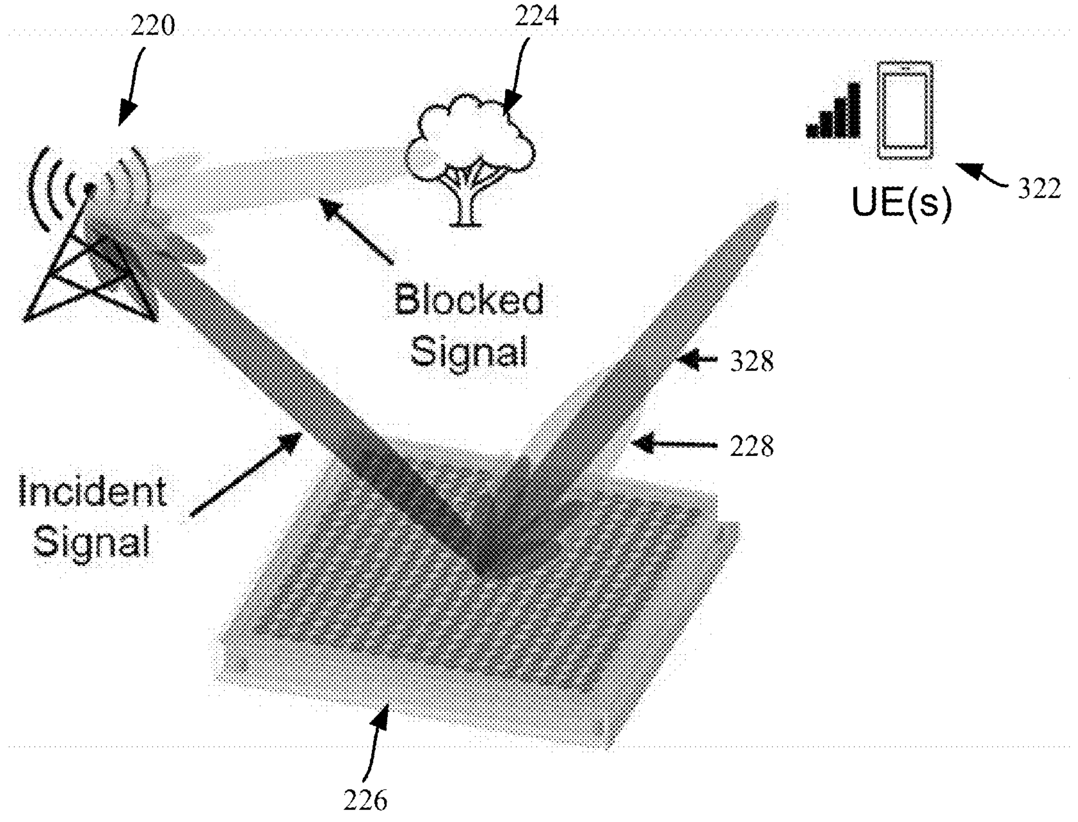
FIG. 3 is an example representation of another use-case scenario in which the reconfigurable surface shapes a narrower, higher-gain beam (relative to FIG. 2) to provide coverage to one or more user equipment devices at a larger distance, in accordance with various example embodiments and implementations of the subject disclosure.

FIGS. 2 and 3 are examples of typical use-case scenarios based on controlled variable beam shaping as described herein. As shown in FIG. 2, in one direction a signal from a base station 220 to nearby user equipment (UEs) 222 is blocked by an obstacle 224. At basically the same time, an incident signal from the base station 220 reaches a metasurface panel 226 as described herein, which has a phase profile that reflects a broader (relative to FIG. 3) beam 228 to the nearby UEs 222.

As described herein, the reflected beam is shaped based on the unit cells of the metasurface panel 226; one such unit cell shown in FIG. 2 as the enlarged unit cell 230. Note that one example metallic resonating pattern in the form of a concentric ring-shaped metallic pattern is depicted, with that pattern resonating at a frequency that corresponds to the frequency of the incoming signal. Notwithstanding, a unit cell can have a resonating pattern of any suitable shape (e.g., square, rectangular and so on) that resonates at or near a corresponding frequency of the incoming signal, and is not limited to concentric ring patterns.

In contrast to the scenario depicted in FIG. 2, as shown in FIG. 3, in the same direction the signal from the base station 220 to a more distant user equipment 322 is also blocked by the obstacle 224. In this alternative example scenario, the incident signal from the base station 220 similarly reaches the metasurface panel 226, which has a phase profile that reflects a narrower and higher gain beam 328 (relative to the wider and lower gain beam 228 of FIG. 2) to the more distant UE(s) 322. Thus, the metasurface panel 226 as described herein can provide coverage to nearby UE(s) via a broader reflected beam, or to more distant UE(s) with a beam that is tuned more narrowly (and hence has higher gain). As described herein, the beam shape can be tweaked between broad and narrow based on the curvature of the ground plane of the metasurface. Thus, beam shaping can be used, for example, to provide coverage to nearby UEs with a broader reflected beam, or to more distant UEs with a tuned narrow beam with high gain, such as using linear actuators that are based on stepper motors.

Figure 4:
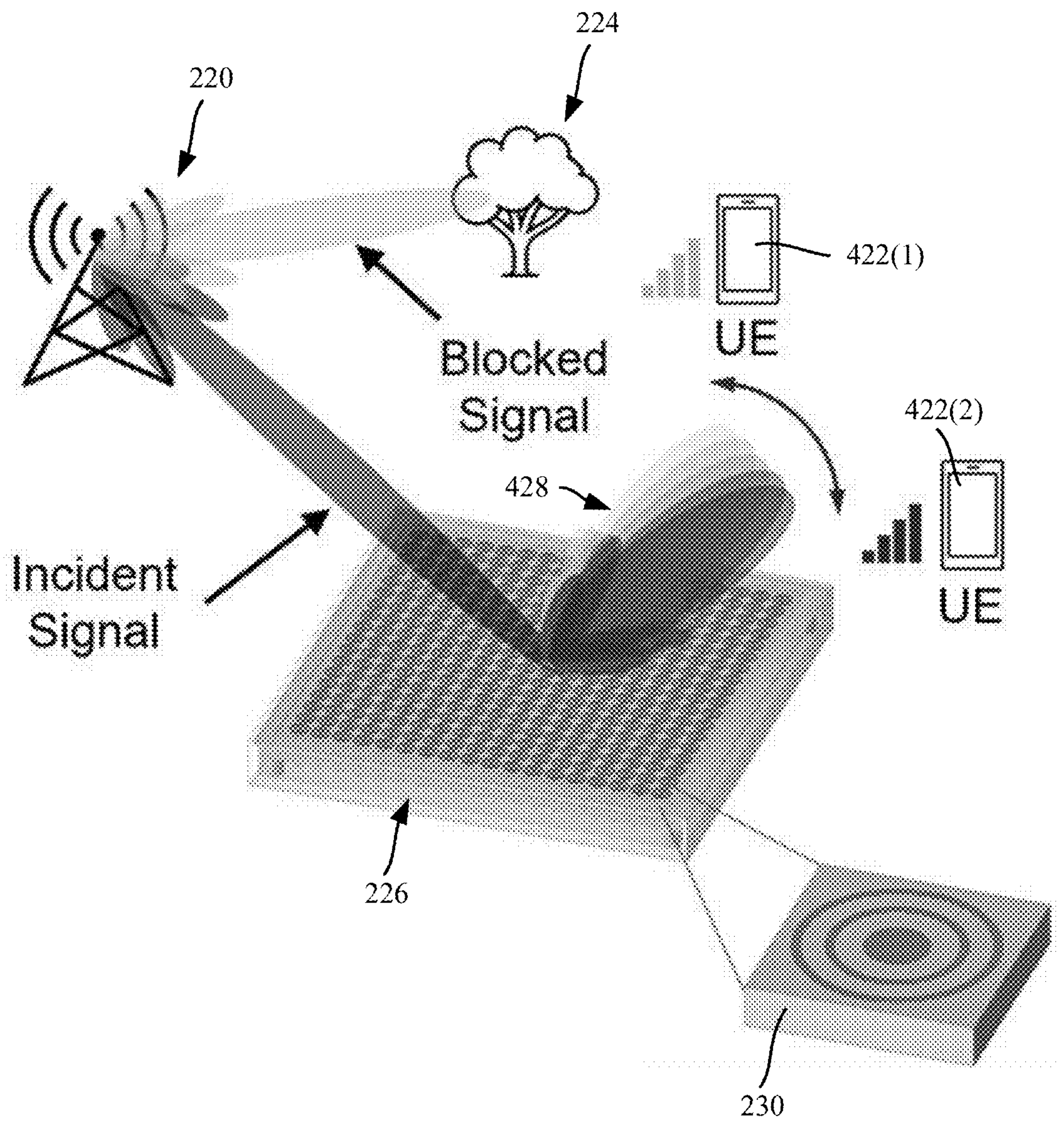
FIG. 4 is an example representation of a use-case scenario in which a reconfigurable surface shapes and steers a broader, lower-gain beam (relative to FIG. 5) to provide coverage to one or more user equipment devices in a desired direction, in accordance with various example embodiments and implementations of the subject disclosure.
Figure 5:
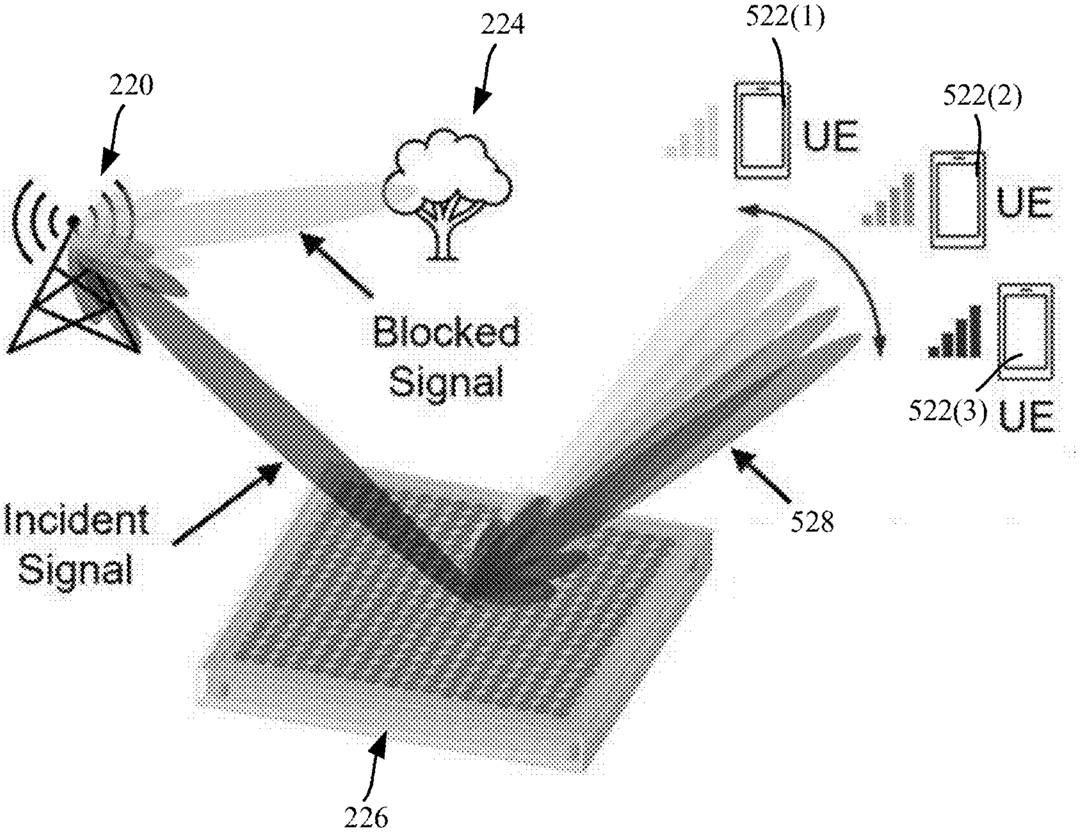
FIG. 5 is an example representation of another use-case scenario in which the reconfigurable surface shapes and steers a narrower, higher-gain beam (relative to FIG. 4) to provide coverage to one or more user equipment devices at a larger distance, in accordance with various example embodiments and implementations of the subject disclosure.
Figure 6A:
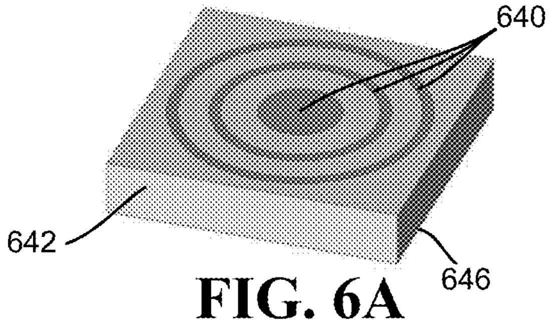
FIGS. 6A-6D are example representations of different air cavity thickness (gaps) separating a substrate of a unit cell from a corresponding portion of the flexible metallic ground plane as the flexible ground plane is curved and/or vertically moved in different amounts to achieve reconfigurability in the reflected signal, in accordance with various example embodiments and implementations of the subject disclosure.
Figure 6B:
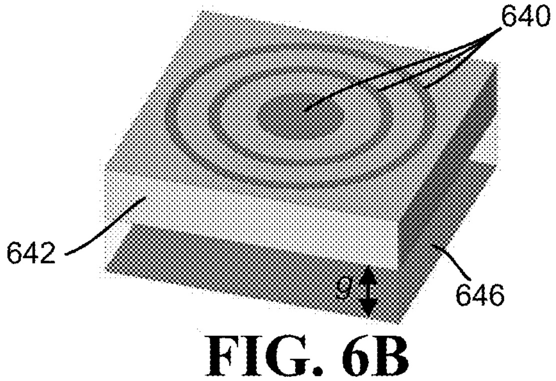
Figure 6C:
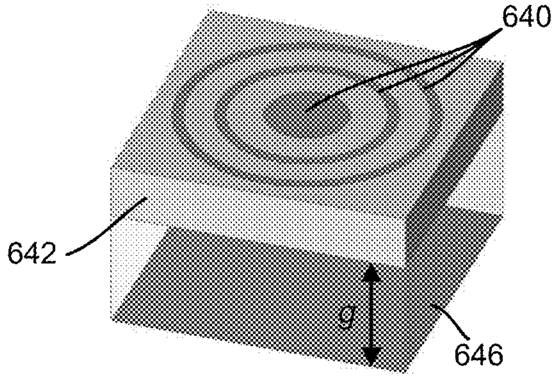
Figure 6D:
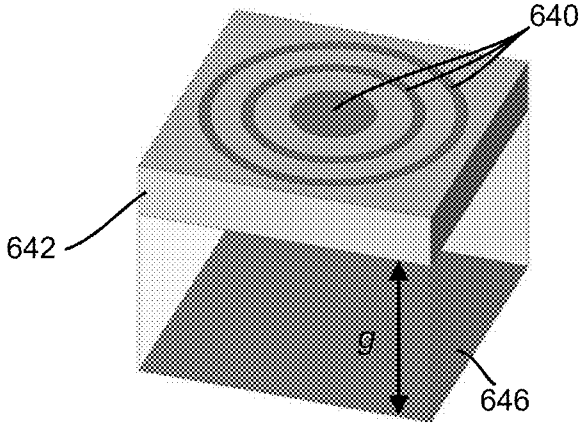

FIGS. 4 and 5 are examples of typical use-case scenarios based on controlled variable beam steering (and beam shaping) as described herein. As with FIGS. 2 and 3, in FIGS. 4 and 5, in one direction a signal from the base station 220 to nearby user equipment (UEs) 422(1) and 422(2) is blocked by an obstacle 224. At basically the same time, an incident signal from the base station 220 reaches the metasurface panel 226 as described herein, which has a phase profile that reflects a broader (relative to FIG. 5) beam 428 to the nearby UEs 422(1) and 422(2). However, beam steering as described herein provides the UE 422(2) with a stronger signal (the darker reflected beam) relative to the UE 422(1); different beam steering (e.g., represented by the curved arrow) can be used such that both UEs 422(1) and 422(2) are in the direction of some amount of the reflected beam, or instead such that the UE 422(2) has a stronger reflected signal relative to the UE 422(1).

In contrast to the scenario depicted in FIG. 4, as shown in FIG. 5, in the same direct direction the signal from the base station 220 to a more distant user equipment (UEs) 522(1)-522(3) is also blocked by the obstacle 224. In this alternative example scenario, the incident signal from the base station 220 similarly reaches the metasurface panel 226, which has a phase profile that reflects a narrower (relative to FIG. 4) and higher gain beam 528 (relative to the wider and lower gain beam 428) that is beam steered to some (or only one) of the more distant UE(s) 522(1)-522(3). Thus, the metasurface panel 226 as described herein can provide coverage to nearby UEs via a steered, broader reflected beam (FIG. 4), or to more distant UEs with a steered beam that is tuned more narrowly (and hence has higher gain). As described herein, the beam shape can be tweaked between broad and narrow based on the curvature of the ground plane of the metasurface, and the beam can be steered based on the vertical positioning of the ground plane relative to the metallic elements. Thus, for example, beam steering can used to provide coverage to a moving UE by dynamically moving the beam in the direction towards the UE; this can be achieved with the Piezo drivers/motors as described herein.

In general, the reflective metasurface 226 of FIGS. 2-5 is formed by a two-dimensional periodic array of unit cells. An example unit-cell structure is shown in FIGS. 6A-6D. In this depicted example embodiment, metallic concentric circular loops 640 are printed on a substrate 642, e.g., a 1.0 mm thick FR4 substrate. The substrate 642 is placed over a ground plane portion 646 (the ground plane's portion/area directly beneath the circular loops 640) forming an air cavity having a variable distance, or gap g as labeled in FIGS. 6B-6D, in which the gap's distance is based on the curvature and/or tilt of the flexible ground plane (which can be different in each ground plane portion below each unit cell) relative to the resonating metallic concentric circular loops 640/the substrate 642. The reflection phase response of the structure is strongly dependent on the cavity thickness, which leads to a significant tuning range for beam shaping and beam steering. The air cavity thickness gap g separating the substrate, and the flexible metallic bottom sheet (ground plane) is movable, based on curving and/or tilting the flexible ground plane to achieve the reconfigurability in the reflected signal.

Figure 7:
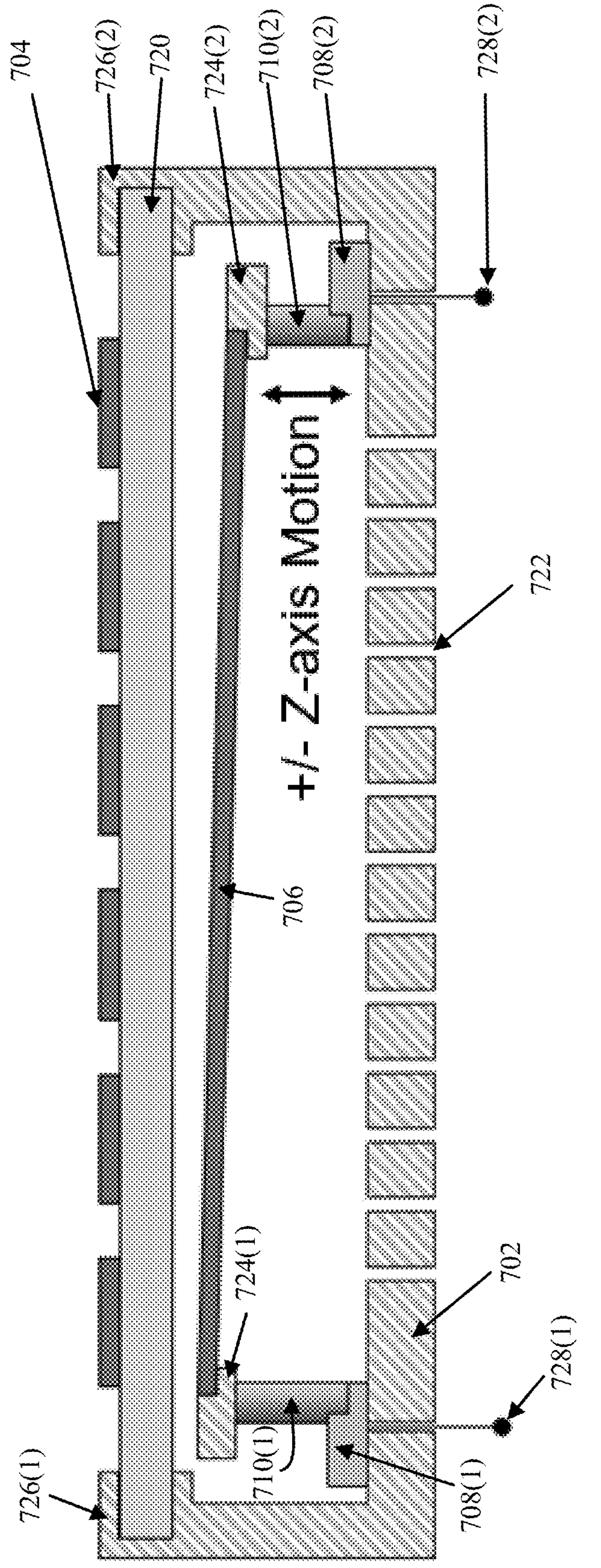
FIG. 7 is a two-dimensional cross-sectional view of an example reconfigurable surface including components within a housing, and vertical movement of a flexible ground plane (moveable metal sheet), in accordance with various example embodiments and implementations of the subject disclosure.

Additional details of the panel are shown in the cross-sectional 2D/front view representation in FIG. 7, highlighting various parts and the tuning mechanism. The labeled parts in FIG. 7 include the housing 702, the metallic elements 704, the flexible and moveable ground plane sheet 706, a substrate 720 and perforations 722. Two of the four flexible ground plane sheet support anchors 724(1) and 724(2) are shown, as are two of the four substrate supports 726(1) and 726(2). FIG. 7 also highlights how two of the four linear actuators 708(1) and 708(2) are controllable via control terminals 728(1) and 728(2) for the linear actuators.

Also represented in FIG. 7 are two of the four motors (vertical actuators such as Piezo motors) 710(1) and 710(2) that are controllable to change the vertical positioning of the flexible and moveable ground plane sheet 706. As is understood, separate control terminals (not explicitly shown in FIG. 7) for driving the four motors are also provided. In the example of FIG. 7, the right motor 710(2) (or two right motors, of which only the right motor 710(2) is shown) has lowered the flexible and moveable ground plane sheet 706 in the −Z direction such that the right side of the flexible and moveable ground plane sheet 706 is lower than the left side, such as by driving the right-side motor(s) downwardly relative to the left side motor(s). Depending on the prior tilt angle, if any, the left motor 710(1) (or two left motors, of which only the left motor 710(1) is shown) may have moved the left side upward (in the +Z direction) relative to the right side. Note that all motors may be controlled to achieve the tilt angle depicted in FIG. 7. Further note that although not depicted in FIG. 7, the tilt angle also may include an amount of tilt from forward to back.

The housing 702 and support structure or anchors 724(1) and 724(2) and/or 726(1) and 726(2) can be made using various materials, such as TEFLON, ABS, PET, PET-G and/or any other commonly available RF transparent material. The thickness of the flexible sheet 706 needs to be thick enough to not allow mechanical breakage or failure, yet thin enough to accommodate the force of the linear actuators including 708(1)-708(2) and vertical motors including 710 (1)-710(2) that curve and/or flex the ground plane sheet 706. A slightly thicker sheet can be used as the panel size increases, to avoid creating a negative sag in the center due to gravity. A simple spring-like structure (not explicitly shown) can be used in the middle of the sheet 706 to mitigate this concern without increasing any complexity in the design.

In one example implementation, commercially available linear motion actuators, such as commercially available Ladex part number 195200-237, can provide up to one-half inch of linear motion. Other, similar linear actuators can be used for larger motion displacement. In this example implementation, the actuators are placed at 45-deg angles in each corner to provide linear motion or force towards the interior of the cavity/housing as generally represented herein. One suitable commercially available vertical motor/actuator is a PI N-412 piezo motor actuator.

Figure 8:
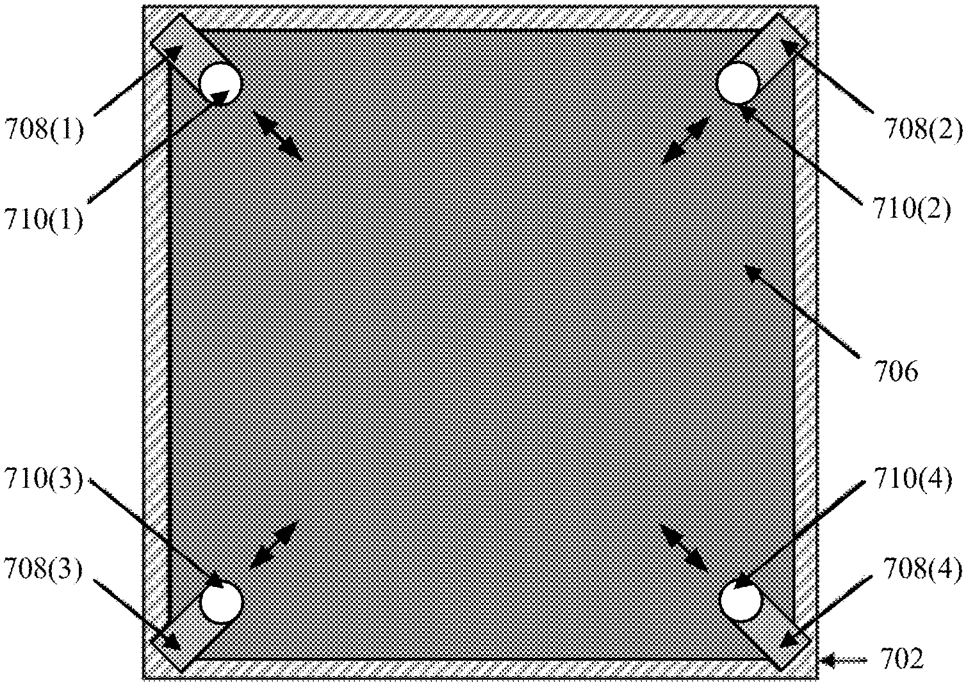
FIGS. 8 and 9 are example top view representations of a flexible ground plane showing how horizontally-oriented linear actuators and vertically-oriented piezo motors can be driven to determine the shape and/or tilt of a flexible ground plane (moveable metal sheet), in accordance with various example embodiments and implementations of the subject disclosure.
Figure 9:
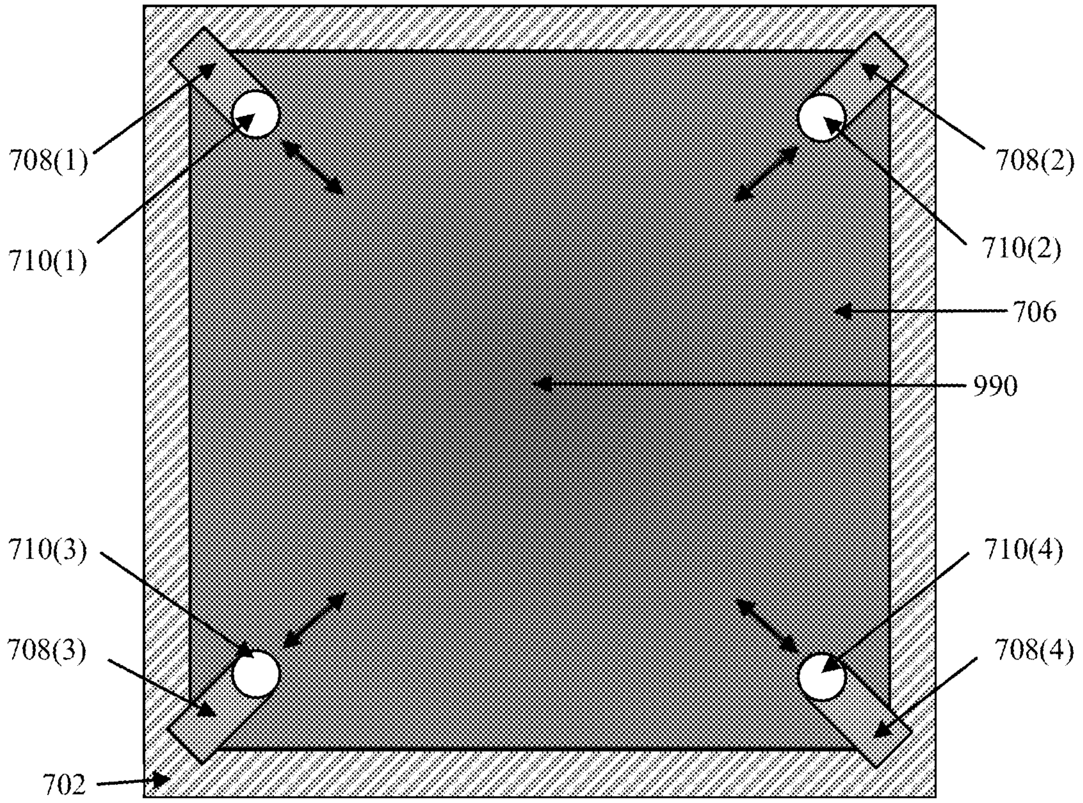

FIGS. 8 and 9 show top view representations of the linear ±X actuators 708(1)-708(4) and +Z vertical (e.g., Piezo, or PZ) motors 710(1)-710(2) that respectively curve and/or tilt the ground plane sheet 706; (any vertical motion by the +Z vertical motors 710(1)-710(4) is not visible in these top views). Note that the top view representations shown herein allow the actuators to be seen "through" the metallic elements, substrate, flexible sheet corners and sheet supports for purposes of description. Relative to FIG. 8, in FIG. 9 the actuators 708(1)-708(4) have curved the sheet 706 inwards, creating a curvature/gradient 990 in the center. The metallic elements and substrate (also in the housing 702) are not shown in FIGS. 8 and 9, to emphasize the inwards and outwards direction of motion (the double-ended arrows pointing towards and away from the center of the sheet 706) from the linear ±X actuators 708(1)-708(4).

Figure 10:
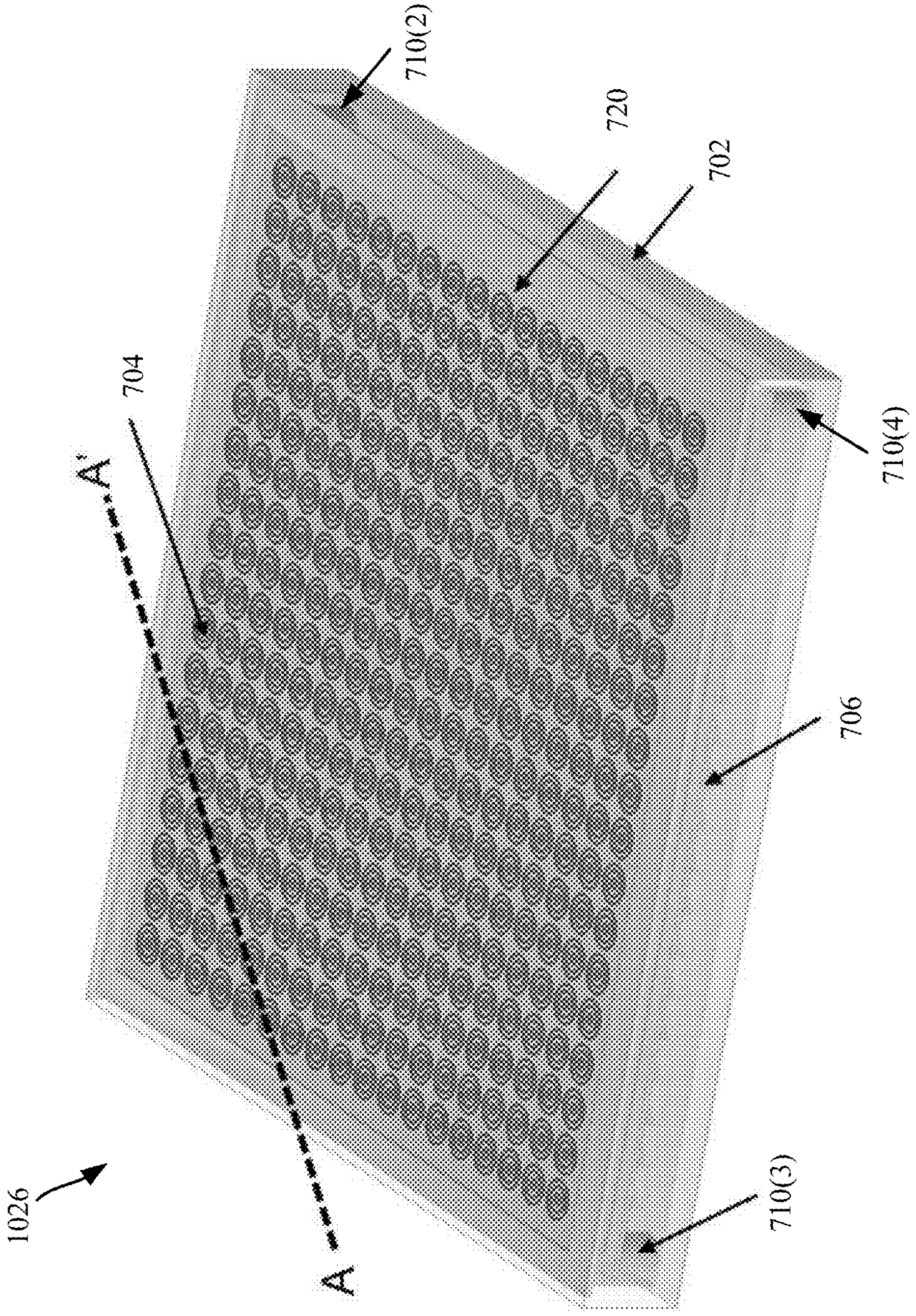
FIG. 10 is an isometric full section view of an example reconfigurable surface including components within a housing, in accordance with various example embodiments and implementations of the subject disclosure.
Figure 11:
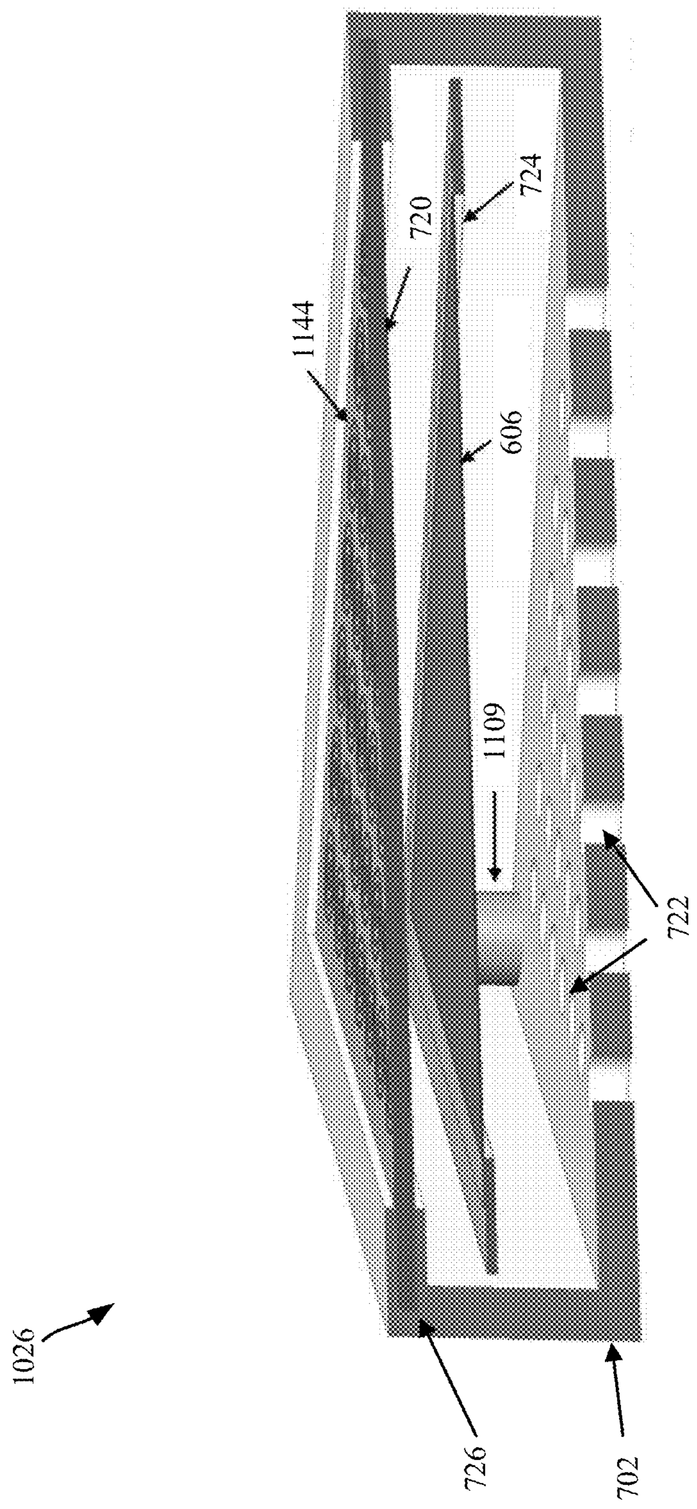
FIG. 11 is a sectional view (based on the cut-plane A-A' of FIG. 10) of the example reconfigurable surface including components within a housing, in accordance with various example embodiments and implementations of the subject disclosure.
Figure 12:
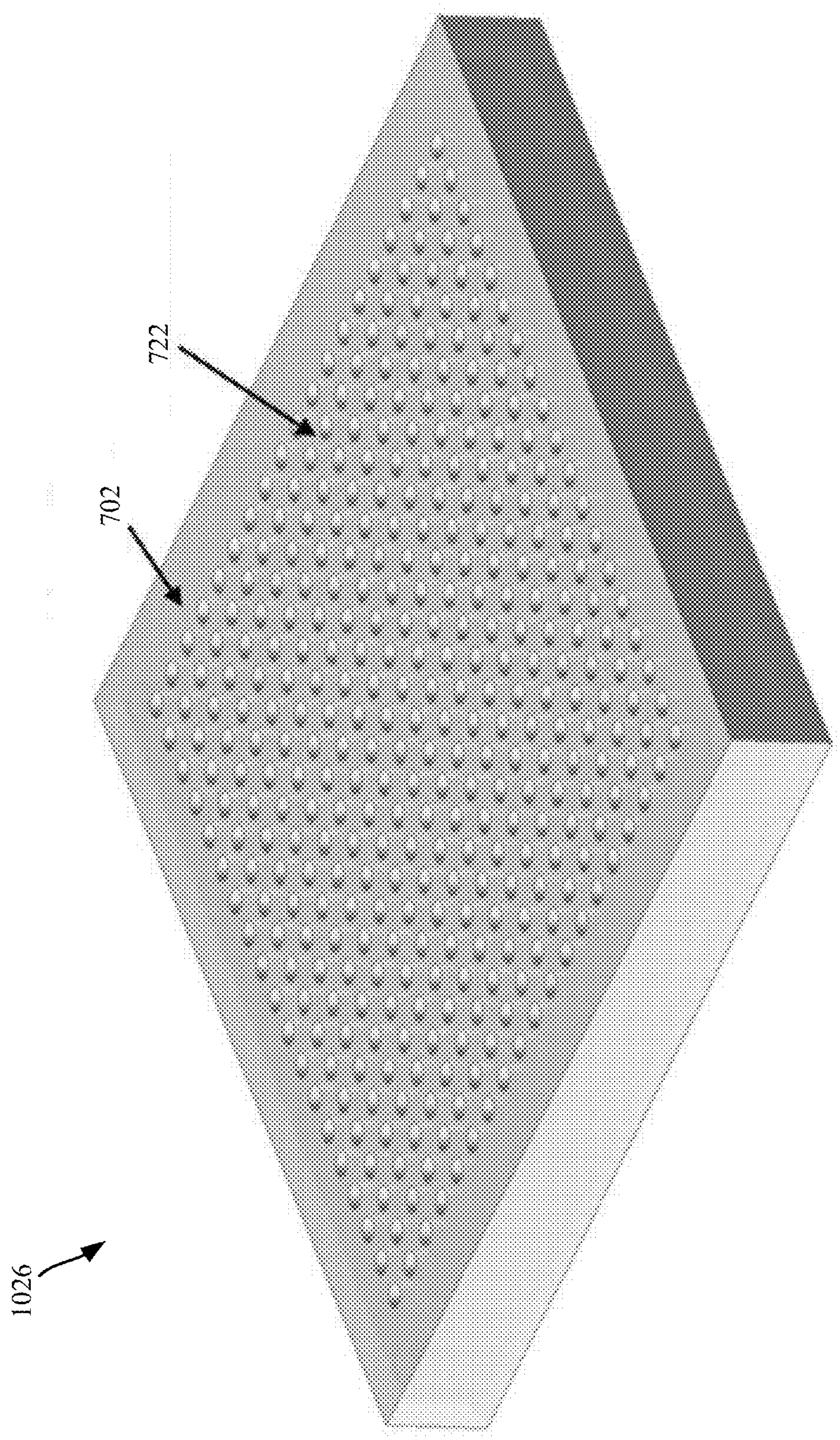
FIG. 12 is a back side view of the example reconfigurable surface housing showing perforations to reduce air damping, in accordance with various example embodiments and implementations of the subject disclosure.

The beam shaping functionality can be incorporated into a complete product, such as shown in FIGS. 10-12. More particularly, FIG. 10 shows a 3D isometric view of a metasurface panel 1026 with housing 702 and other components, including one labeled metallic element 704 of the multiple (e.g., 18×18 in this example) unit cells on the substrate 720. The flexible metal plane 706 can be curved by the actuators, one horizontal actuator in each corner; the flexible metal plane 706 is also moveable (tiltable and/or height adjustable and/or curveable to an extent) via the motors coupled to each corner, including by at least part of the visible motors 710(2)-710(4). A cut plane (A-A') is highlighted in FIG. 10, to show the interior of the structure (in FIG. 11).

In FIG. 11, the sectional view (corresponding to the cut plane A-A' of FIG. 10) of the housing 702 is shown with unit cells (collectively 1144) above the substrate 742. In FIG. 11, an actuator component and motor component are labeled together as 1109. One type of anchor is the support anchor 726 that supports one of the four corners of the moveable (flexible) ground plane 706; the other three sheet anchors are not labeled in this view. Other anchors, including the substrate anchor labeled 724, support the substrate 720. FIG. 11 also shows the perforations (collectively 722), which help to avoid any air damping, facilitate heat dissipation, and result in weight reduction of the panel. The reverse side of the panel is shown in FIG. 12, which highlights these perforations 722 in the underside of the housing 702.

Figure 13:
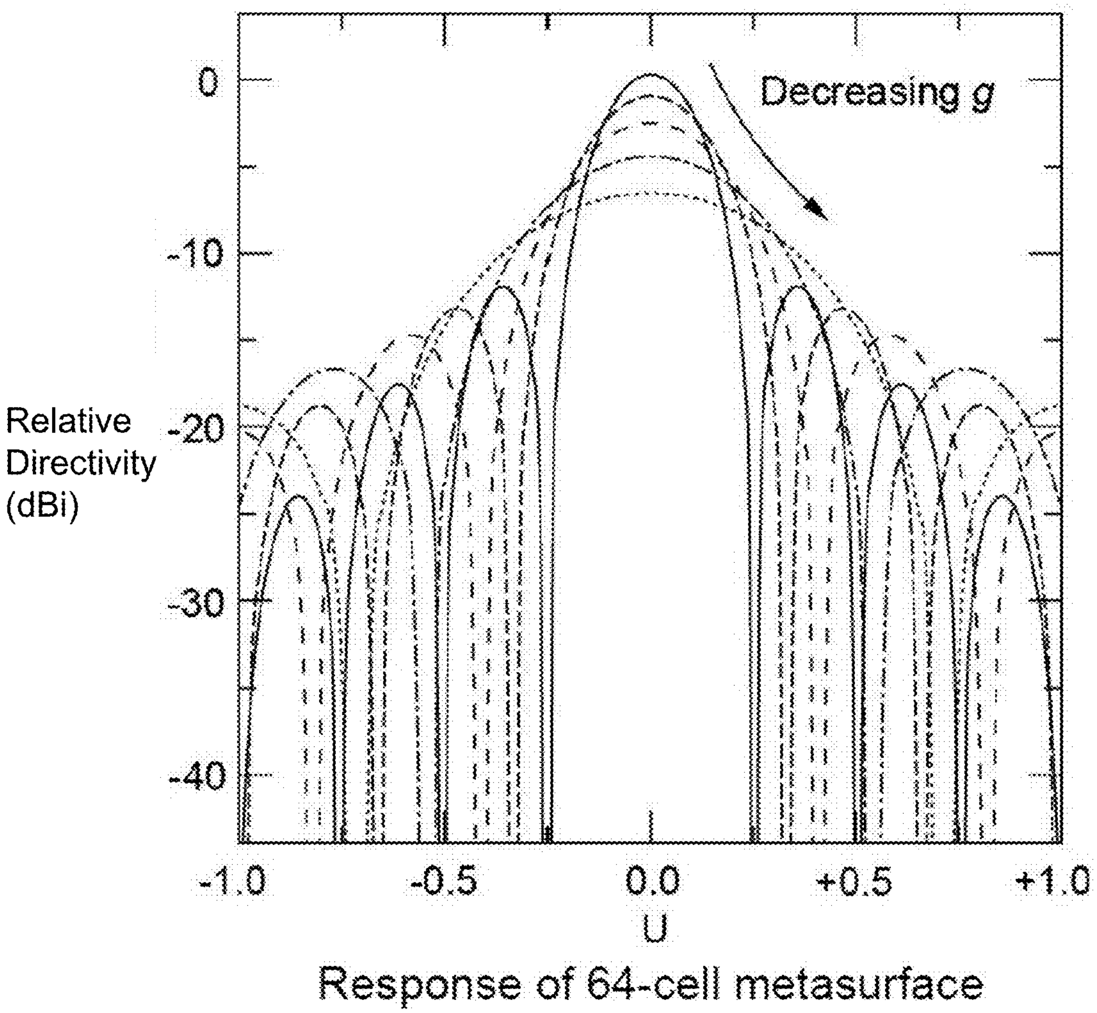
FIG. 13 is an example graph showing a simulation of relative directivity response of a 64-cell metasurface showing how the beam shape can be adjusted based on varying (including decreasing) gap distances, in accordance with various example embodiments and implementations of the subject disclosure.
Figure 14:
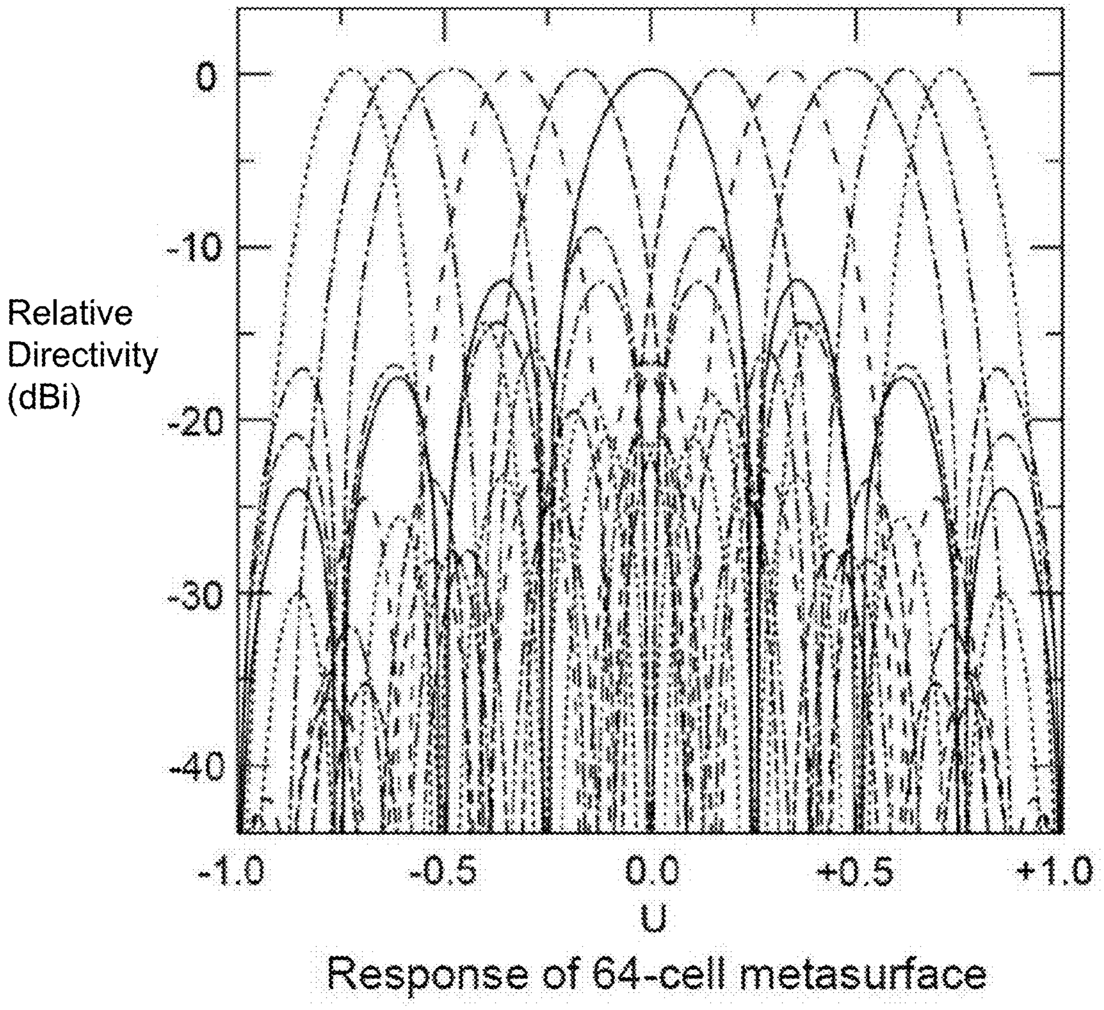
FIG. 14 is an example graph showing a simulation of relative directivity response of a 64-cell metasurface showing how the beam can be steered based on varying (including decreasing) gap distances, in accordance with various example embodiments and implementations of the subject disclosure.

A simulated (e.g., using Ansys HFSS) phase profile demonstrated different beam shape changes with a change of curvature. The simulation proof can be further proven using Ansys HFSS. More particularly, an 8×8 panel was designed and analyzed as shown in FIGS. 13 and 14, resulting in beam shape change with change in the gap between substrate and the movable metal sheet. As shown in FIG. 13, the simulated relative directivity response of the 64-cell metasurface shows that with decreasing gap g, (normalized from −1.0 to +1.0), the beam shape can be tweaked, and vice-versa for increasing gap. As shown in FIG. 14, the simulated relative directivity response of the 64-cell metasurface shows that by the vertically-induced positioning of the ground plane that changes the gap, (normalized from −1.0 to +1.0), the beam steering direction can be tweaked.

FIGS. 15, 17, 19 and 21 are example cross-sectional 2D/front view representations directed to vertical movement via the motors 710(1)-710(4). In FIGS. 15, 17 19 and 21, the labeled components correspond to those of FIG. 7 and are not again described, except that the control terminals 1529 (1) and 1529(2) represent control terminals coupled to the vertical driving motors 710(1)-710(4), (whereas the control terminals 728(1) and 728(2) in FIG. 7 were coupled to the horizontal driving actuators 708(1) and 708(2)).

Figure 15:
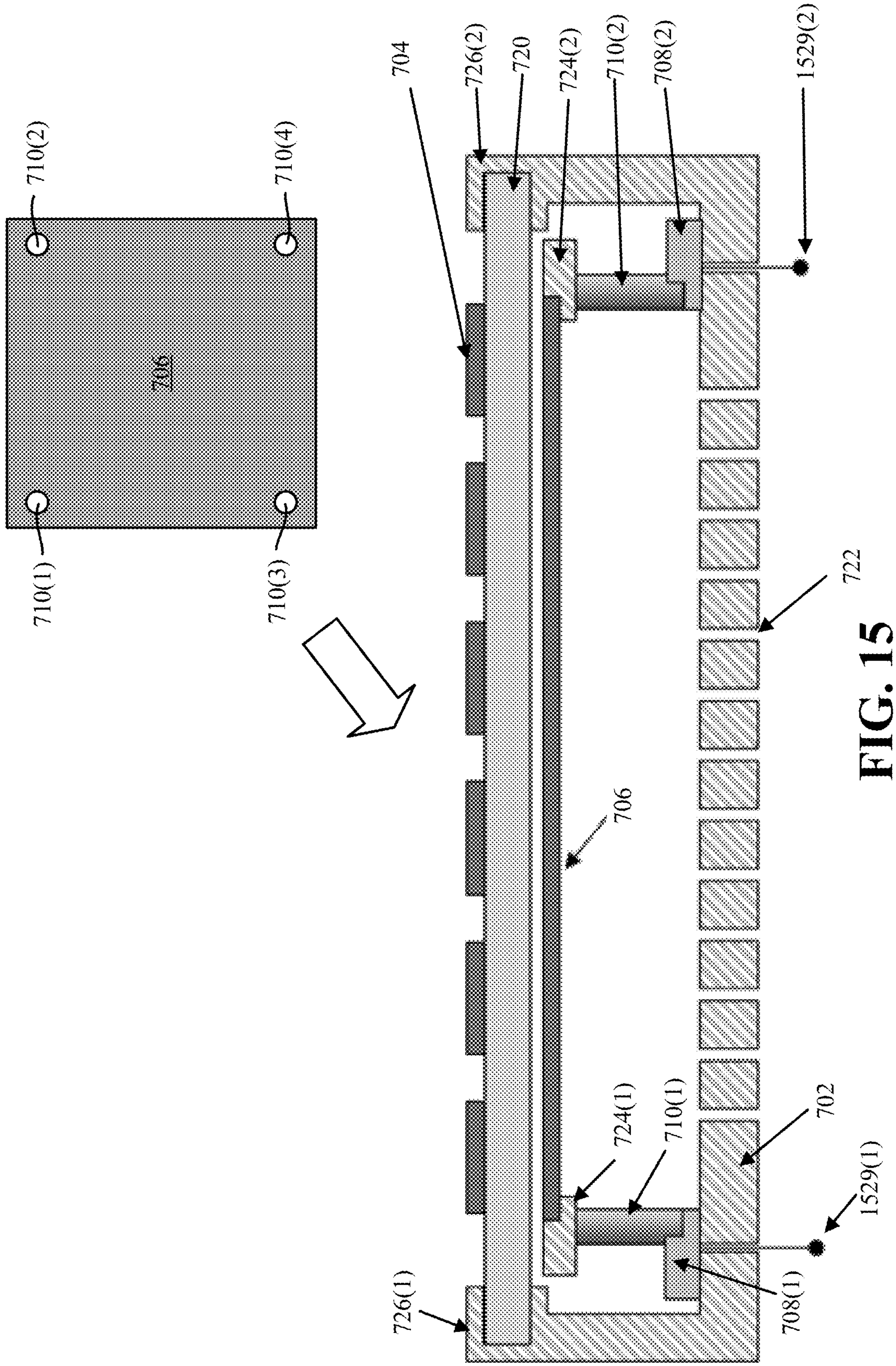
FIG. 15 is a two-dimensional cross-sectional view of an example reconfigurable surface including a tuning mechanism and parts of the reflective metasurface, showing a moveable metal ground plane in a first position along with a top view representation of the moveable plane and actuator biases, in accordance with various example embodiments and implementations of the subject disclosure.
Figure 16:
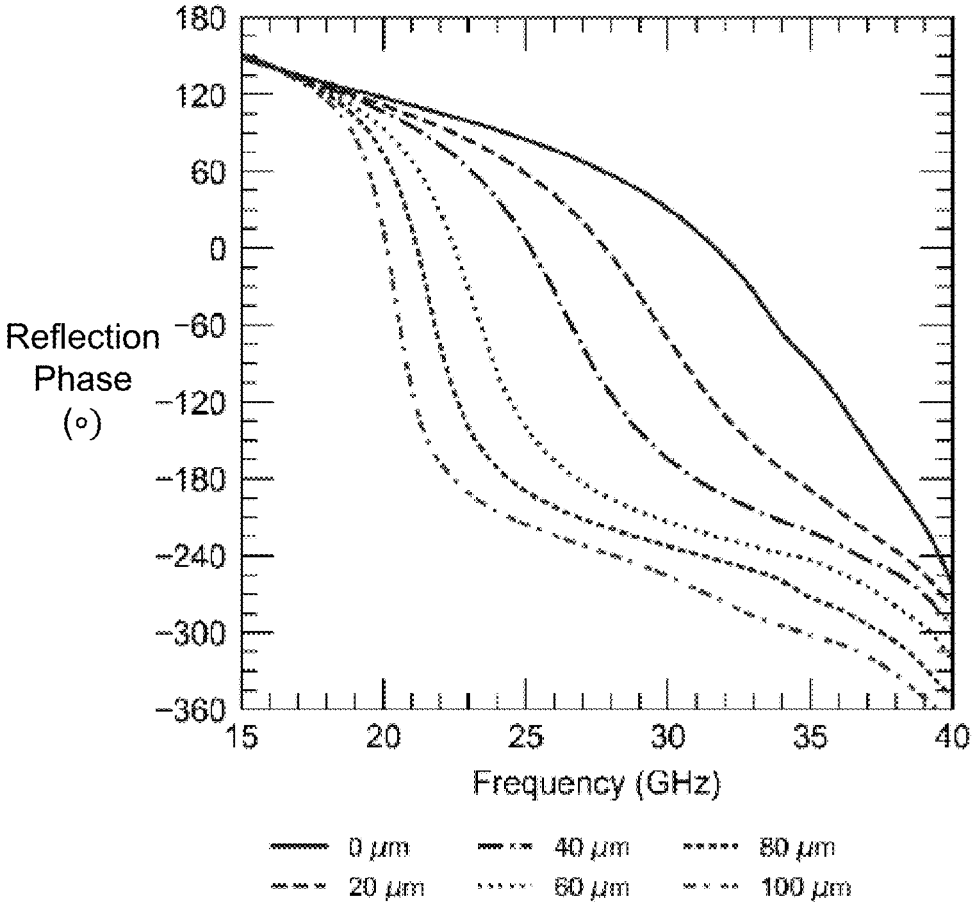
FIG. 16 is an example graph, corresponding to the tuning state of FIG. 15, showing simulated results for reflection phase versus frequency, in accordance with various example embodiments and implementations of the subject disclosure.

In FIG. 15, the ground plane 706 is at a starting position in which no voltage is applied to the vertical driving motors 710(1)-710(4); (zero Piezo motor voltage is represented by the unshaded circles in the top view representation of the ground plane 706 in the upper right corner of FIG. 15). Although not explicitly shown, zero voltage has been applied to the linear actuators, and thus the ground plane 706 is not curved. FIG. 16 shows the reflection phase (in degrees) over various frequencies corresponding to the phase profile of FIG. 15.

Figure 17:
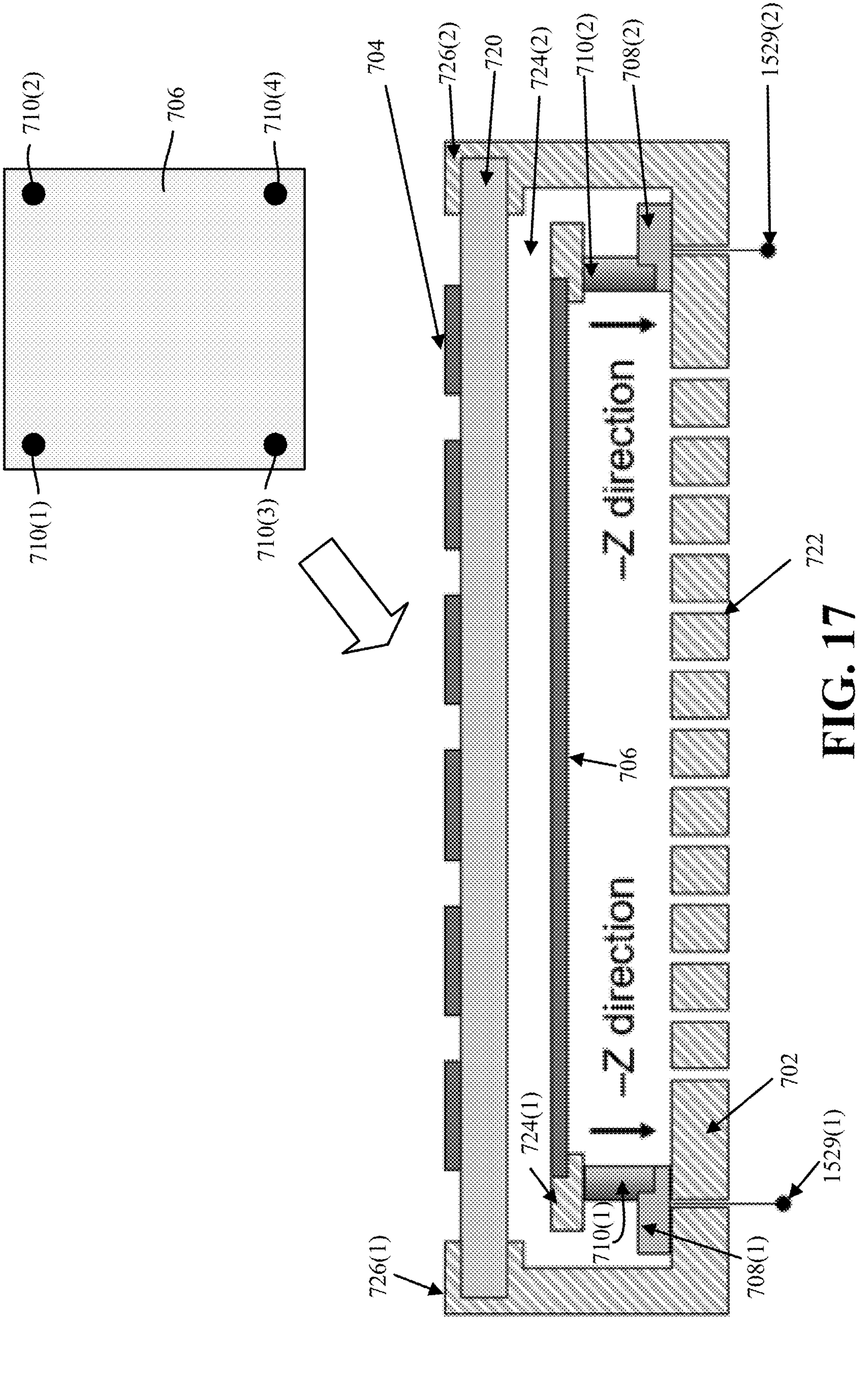
FIG. 17 is a two-dimensional cross-sectional view of an example reconfigurable surface including a tuning mechanism and parts of the reflective metasurface, showing a moveable metal ground plane in a second position (lowered relative to FIG. 15) along with a top view representation of the moveable plane and actuator biases, in accordance with various example embodiments and implementations of the subject disclosure.
Figure 18:
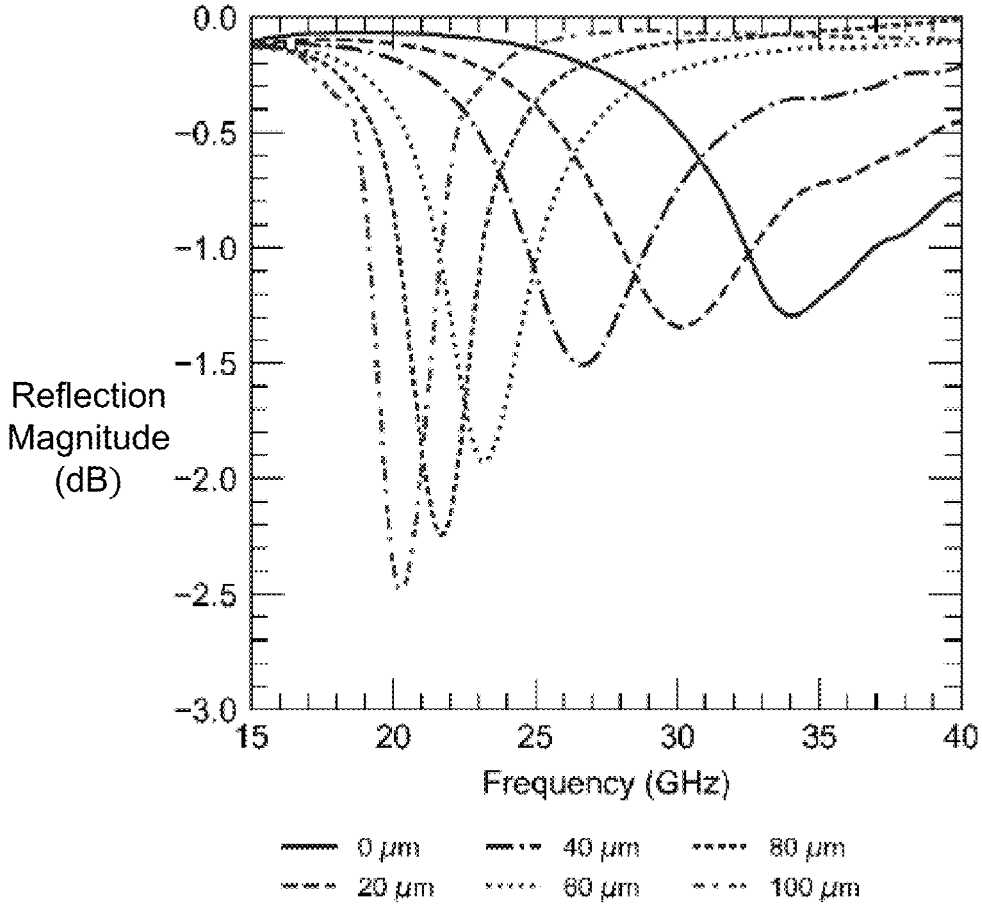
FIG. 18 is an example graph, corresponding to the tuning state of FIG. 17, showing simulated results for reflection magnitude versus frequency, in accordance with various example embodiments and implementations of the subject disclosure.

In FIG. 17, the ground plane 706 is at a position in which the maximum bias voltage has been applied to the vertical driving motors 710(1)-710(4), thereby lowering the height of the moveable metallic sheet 706 relative to FIG. 15; (full Piezo motor voltage is represented by the fully shaded circles in the top view of the ground plane 706 in the upper right corner of FIG. 17). Although not explicitly shown, zero voltage has been applied to the linear actuators, and thus the ground plane 706 is not curved. Note that once the Piezo motors 710(1)-710(4) (and similarly the linear actuators are in their desired driving positions/stages, no power is needed to hold the motors and actuators in the desired phase profile stage; that is, the motors can be driven to a certain stage and the voltage can be taken off to hold the beam shape and direction state, whereby there is static DC power consumption except during motor redriving. FIG. 18 shows the reflection phase (in degrees) over various frequencies corresponding to the phase profile of FIG. 17.

Figure 19:
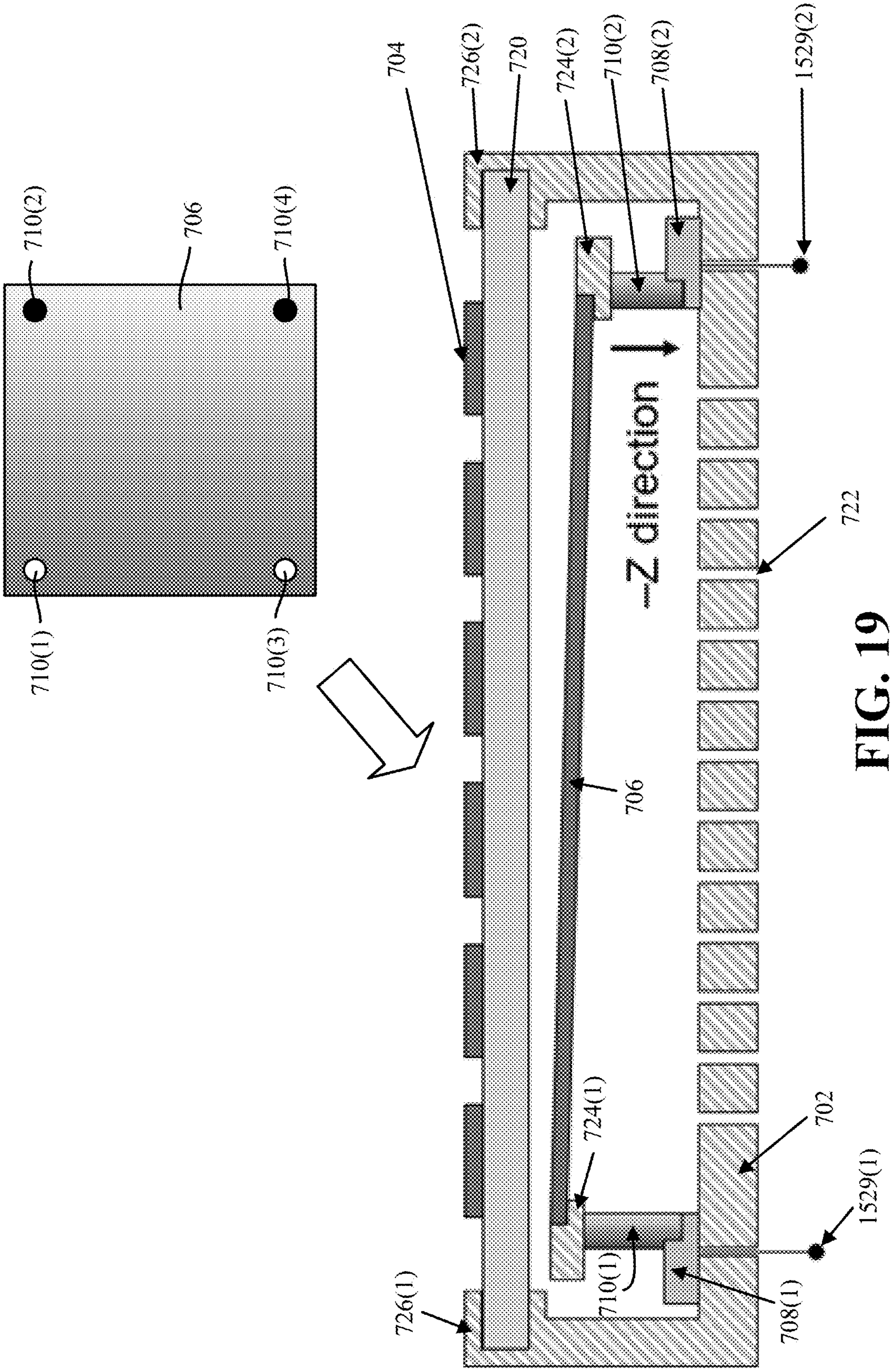
FIG. 19 is a two-dimensional cross-sectional view of an example reconfigurable surface including a tuning mechanism and parts of the reflective metasurface, showing a moveable metal ground plane in a first tilted position, along with a top view representation of the moveable plane showing corresponding actuator biases and phase, in accordance with various example embodiments and implementations of the subject disclosure.
Figure 20:
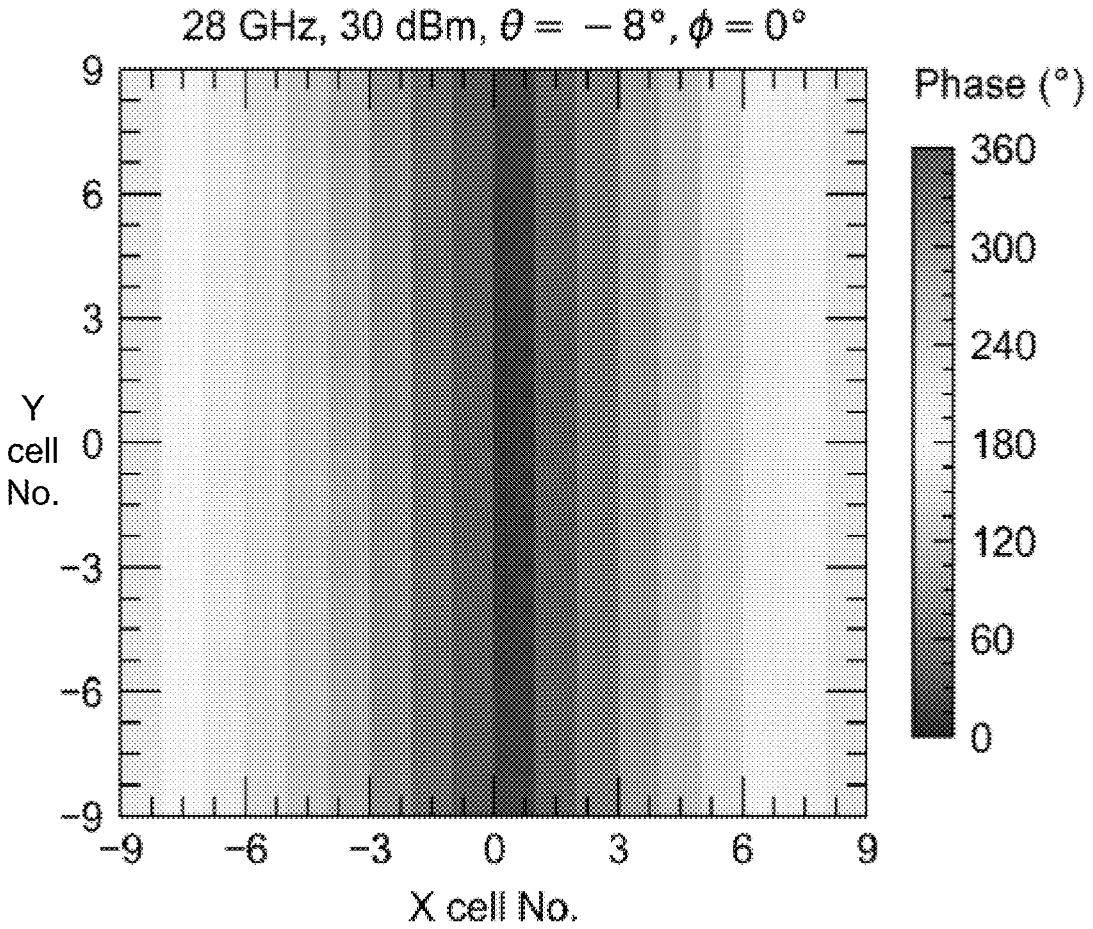
FIG. 20 is an example phase profile representation, corresponding to the tuning state of FIG. 19, in accordance with various example embodiments and implementations of the subject disclosure.

In FIG. 19, (which is similar to the tilt angle of the sheet in FIG. 7 but further includes the top view of the ground plane 706), the ground plane 706 is at a position in which the maximum bias voltage has been applied to the right vertical driving motors 710(2) and 710(4), as represented by the fully shaded circles in the top view of the ground plane 706 in the upper right corner of FIG. 19. No voltage has been applied to the left vertical driving motors 710(1) and 710(3), as represented by the unshaded circles in the top view of the ground plane 706, thus tilting the ground plane 706 relative to the metallic elements 704. Although not explicitly shown, as with FIGS. 15 and 17, zero voltage has been applied to the linear actuators, and thus the ground plane 706 is not curved. FIG. 20, along with the shading in the top view of the ground plane 706 in FIG. 19, shows a representation of the phase profile at a 28 Gigahertz frequency, 30 dBm signal, with a steering angle of θ=−8 degrees and ϕ of zero degrees.

Figure 21:
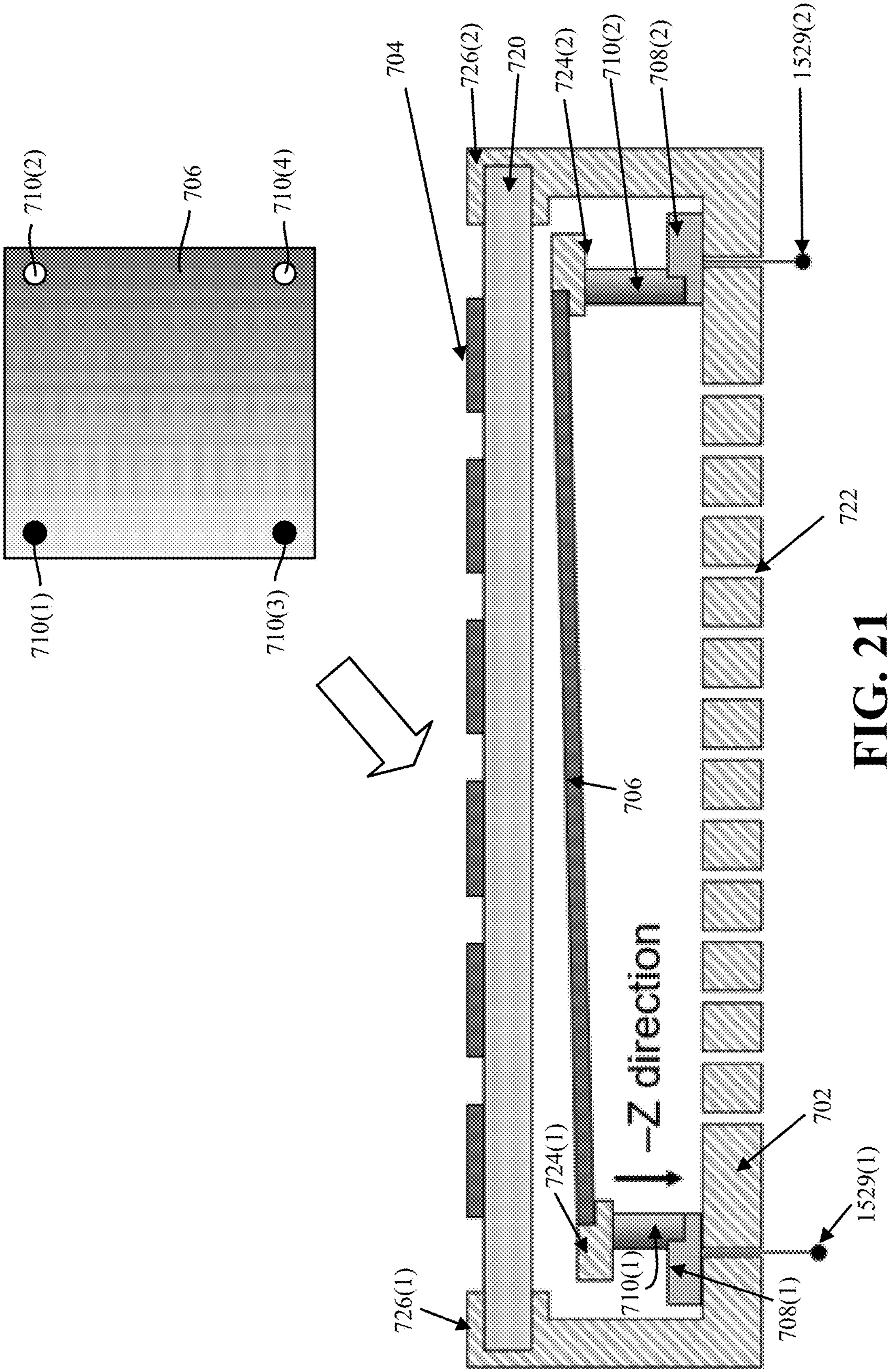
FIG. 21 is a two-dimensional cross-sectional view of an example reconfigurable surface including a tuning mechanism and parts of the reflective metasurface, showing a moveable metal ground plane in a second tilted position (relative to FIG. 19), along with a top view representation of the moveable plane showing corresponding actuator biases and phase, in accordance with various example embodiments and implementations of the subject disclosure.
Figure 22:
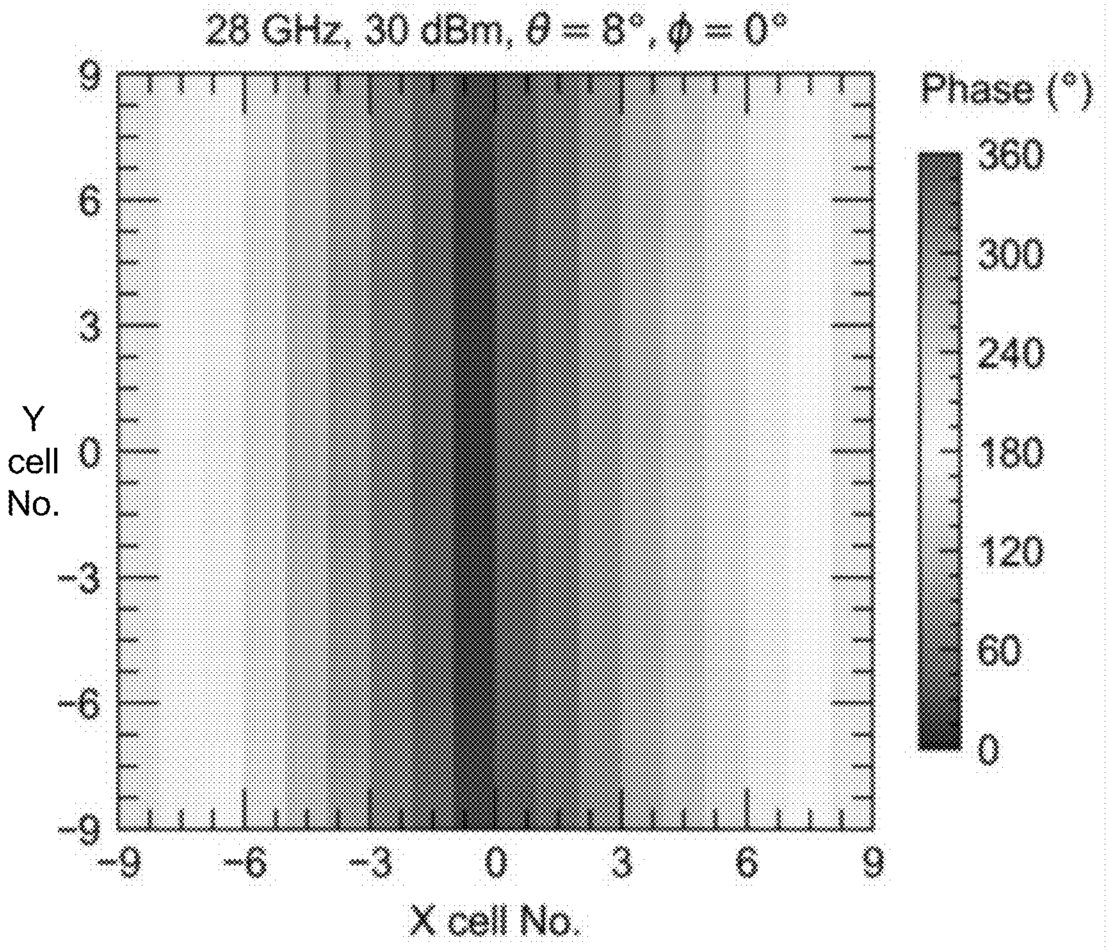
FIG. 22 is an example phase profile representation, corresponding to the tuning state of FIG. 21, in accordance with various example embodiments and implementations of the subject disclosure.

FIG. 21 shows the opposite tilt angle (relative to FIG. 19) of the ground plane 706. In FIG. 21, the ground plane 706 is at a position in which the maximum bias voltage has been applied to the left vertical driving motors 710(1) and 710(3), as represented by the fully shaded circles in the top view of the ground plane 706 in the upper right corner of FIG. 21. No voltage has been applied to the right vertical driving motors 710(2) and 710(4), as represented by the unshaded circles in the top view of the ground plane 706. Although not explicitly shown, as with FIGS. 15, 17 and 19, zero voltage has been applied to the linear actuators, and thus the ground plane 706 is not otherwise curved. FIG. 22, along with the shading in the top view of the ground plane 706 in FIG. 21, shows a representation of the phase profile at a 28 Gigahertz frequency, 30 dBm signal, with a steering angle of 0=+8 degrees and $ of zero degrees.

Figure 23:
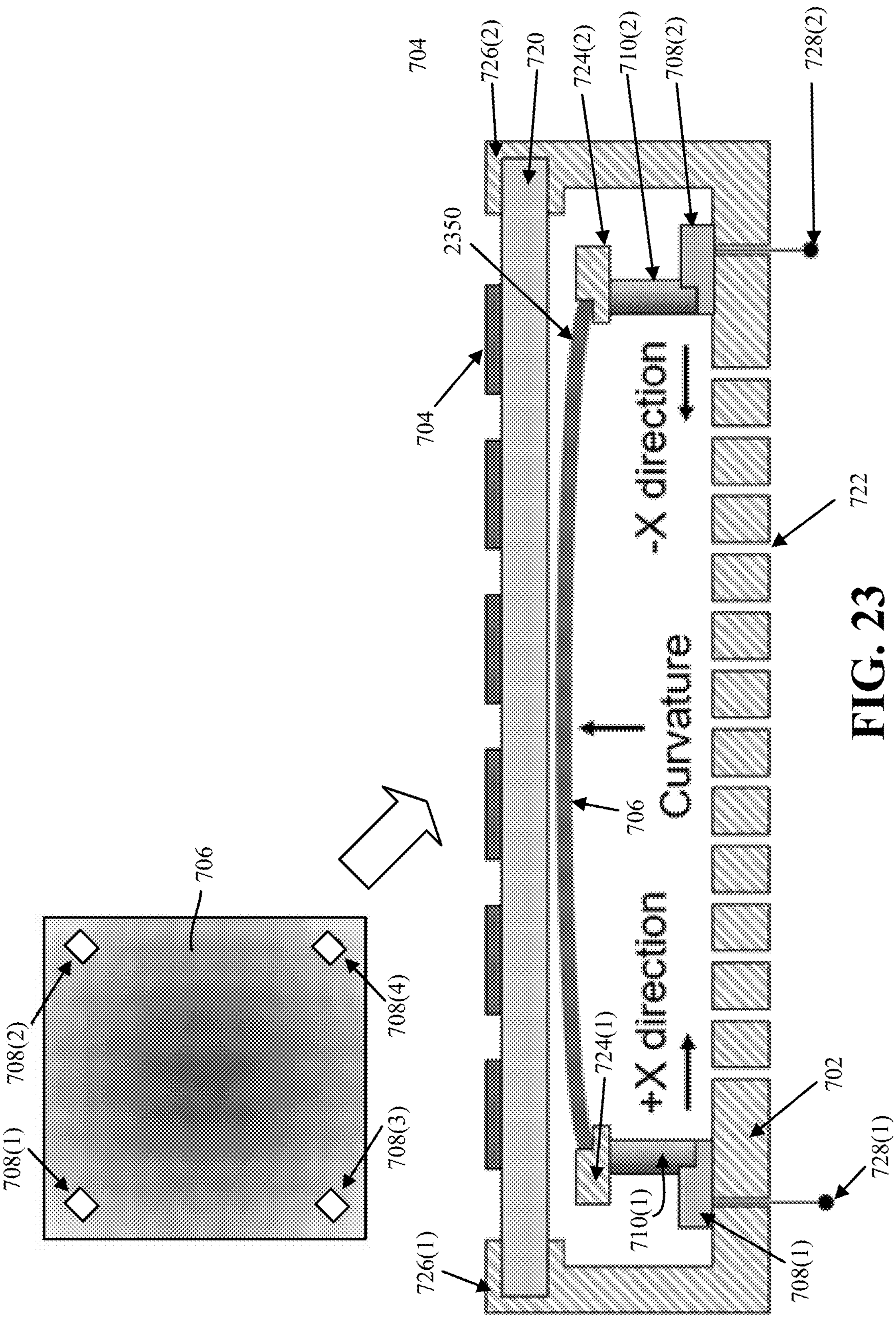
FIG. 23 is a cross-sectional view of the example reconfigurable surface, along with a top view representation of the moveable plane, showing how actuating linear actuators create one curvature in the ground plane that can be tuned in analog style, in accordance with various example embodiments and implementations of the subject disclosure.

FIG. 23 is an example cross-sectional 2D/front view representation directed to horizontal movement via the linear actuators 708(1)-708(4) that curve the ground plane 706. In FIG. 23, the labeled components correspond to those of FIG. 7 and are not again described, including that the control terminals 728(1) and 728(2) in FIG. 7 are coupled to the horizontal driving actuators 708(1) and 708(2).

In FIG. 23, only the linear actuators 708(1)-708(4) are driven towards inside of the cavity, (the Piezo motors are not actuated), creating a relatively mild curvature in the ground plane which thereby changes the beam width (resulting in beam shaping). In other words, the linear actuators 708(1)-708(4) when actuated towards each other push the movable metal sheet 706 towards the inside of the housing 702, creating a curvature in the middle of the ground plane 706 that determines one gradient profile 2450 (generally depicted in FIG. 24). The amount of curvature is dependent on how far the actuators are extended. The lighter-shaded rectangles representing the linear actuators 708(1)-708(4) in FIG. 23 and their positions represent more linear displacement from the actuators' extensions, (compared to the darker-shaded rectangles representing the linear actuators 708(1)-708(4) and their positions in FIG. 25 that represent relatively less linear displacement/actuator extension). Although not explicitly shown, the curved ground plane of FIG. 23 can be lowered via the vertical motors, as in FIG. 17 relative to FIG. 15, while maintaining the amount of curvature.

It should be noted that straightforward beam shaping can be accomplished by driving the motors the same amount in each direction. However, this is not a limitation, and different amounts of driving and/or different driving angles can achieve more complex phase profiles. Further, note that while feasible to use less than four actuators to achieve different phase profiles, e.g., one that pushes up the center, or two actuators (or three) that push two (or three) moveable corners of the ground plane towards two (or one) fixed corner(s) of the ground plane, it has been found that for many applications too sharp of a gradient results, and thus for many applications four actuators provide desirable results.

Figure 25:
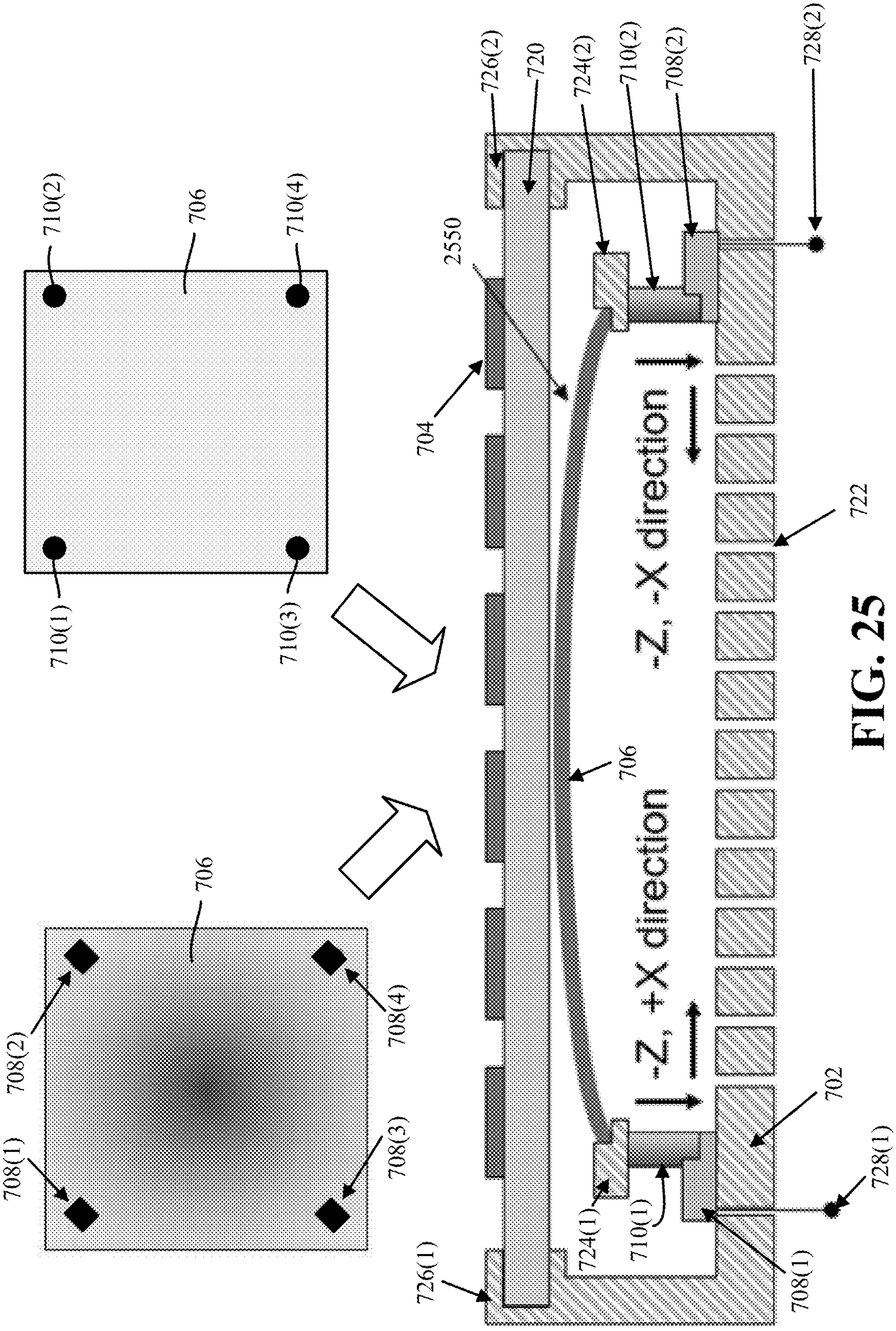
FIG. 25 is a cross-sectional view of the example reconfigurable surface, along with a top view representation of the moveable plane, showing how actuating linear actuators create a different curvature (relative to FIG. 23) in the ground plane that can be tuned in analog style, in accordance with various example embodiments and implementations of the subject disclosure.

FIG. 25 is an example cross-sectional 2D/front view representation directed to horizontal movement via the linear actuators 708(1)-708(4), along with vertical movement via the vertical motors 710(1)-710(4). In FIG. 25, the labeled components correspond to those of FIG. 7 and are not again described.

Figure 26:
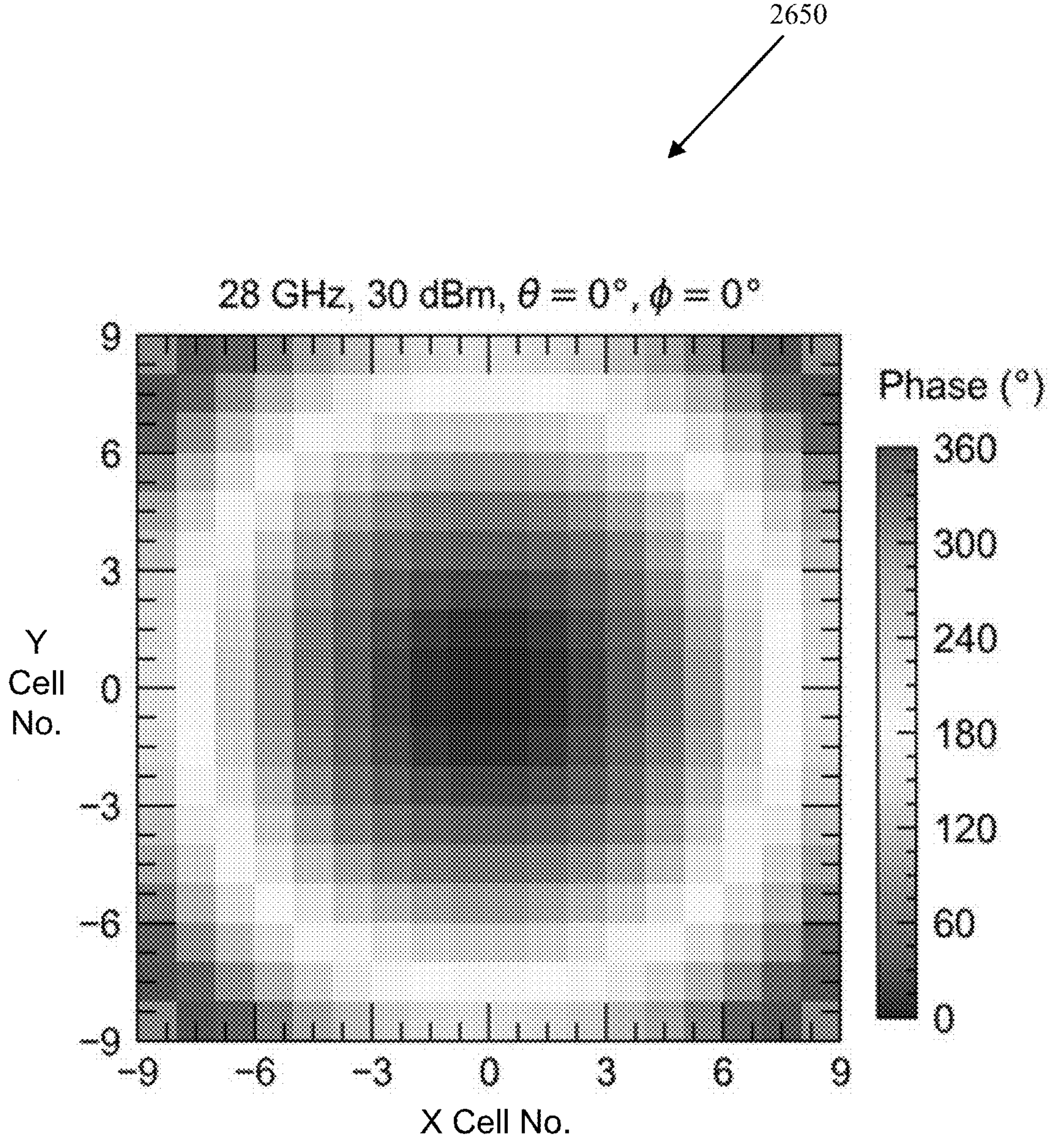
FIG. 26 is an example simulated phase profile of an 18×18 unit-cell reconfigurable surface panel that demonstrates beam shape change with a different change of ground plane curvature (relative to FIG. 24), in accordance with various example embodiments and implementations of the subject disclosure.

In this example, moving all four corner piezo motors in the −Z direction, along with driving the linear actuators 708(1)-708(4) driven further towards the inside of the cavity in the +X and −X directions (relative to FIG. 23), creates a more pronounced curvature in the movable metal sheet 706 that determines a different gradient profile 2650 (generally depicted in FIG. 26).

Figure 24:
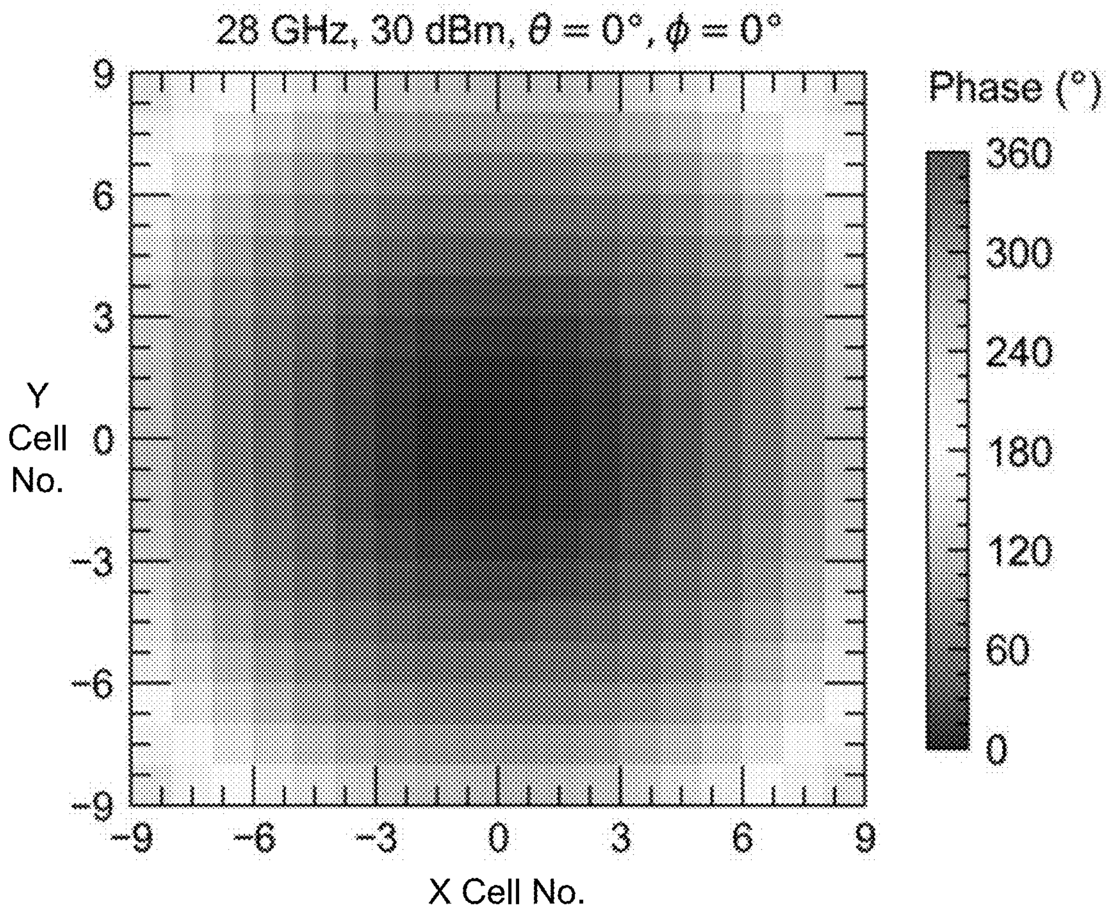
FIG. 24 is an example simulated phase profile of an 18×18 unit-cell reconfigurable surface panel that demonstrates beam shape change with a change of ground plane curvature, in accordance with various example embodiments and implementations of the subject disclosure.

In sum, FIGS. 24 and 26 are example representations of a simulated (e.g., using Ansys HFSS) phase profiles of an 18×18 unit-cell panel that demonstrate different beam shape changes with a change of curvature, corresponding to the different curvatures in FIGS. 23 and 25, respectively. The simulation proof can be further proven using Ansys HFSS.

Figure 27:
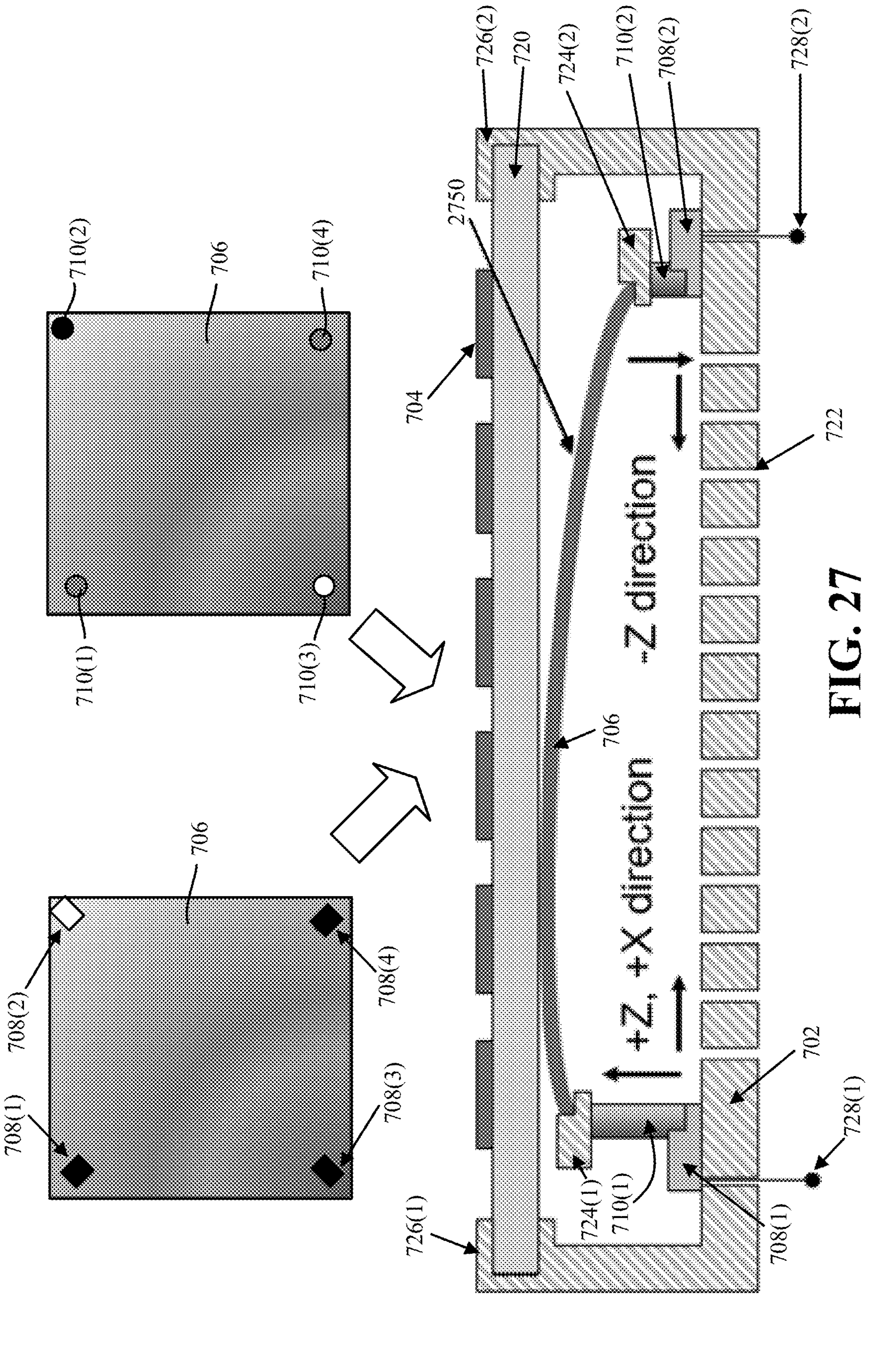
FIG. 27 is a cross-sectional view of the example reconfigurable surface, along with top view representations of the moveable plane, showing how actuating linear actuators and vertical motors create a curvature in the ground plane that results in an offset gradient profile, in accordance with various example embodiments and implementations of the subject disclosure.
Figure 28:
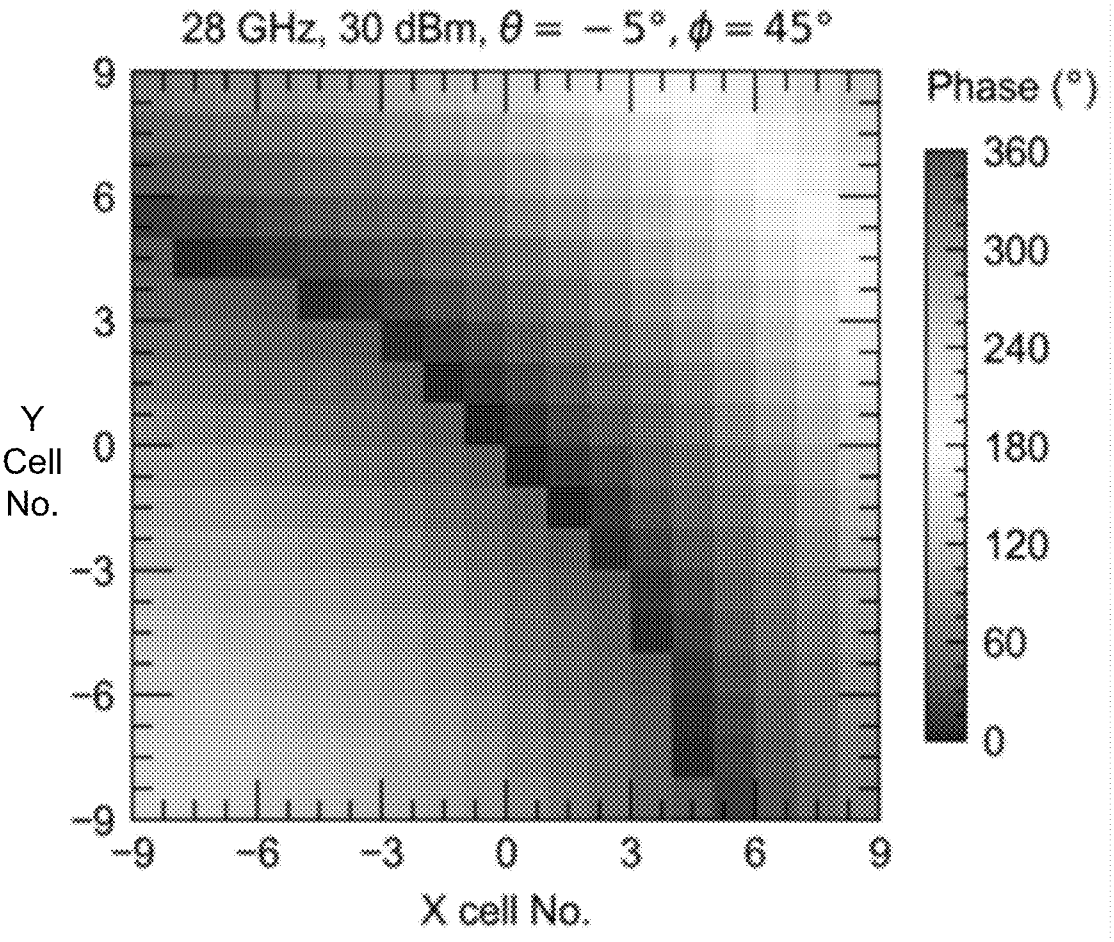
FIG. 28 is an example simulated offset gradient phase profile, corresponding to FIG. 27, of an 18×18 unit-cell reconfigurable surface panel that demonstrates beam shape change with a change of ground plane curvature, in accordance with various example embodiments and implementations of the subject disclosure.

FIGS. 27-30 are directed towards offset gradient profiles that are achieved by a combination of different amounts of vertical movement and horizontal movement. In FIG. 27, only three of the linear actuators 708(1), 708(3) and 708(4) are driven towards inside of the cavity; the actuator 708(2) is not driven and remains less (or zero) extended towards the center. The vertical motors are actuated as per the rightmost top view profile, namely the vertical motors 710(1) and 710(4) have mid-bias represented by the shaded circles, the vertical motor 710(2) has a bias (unshaded circle) corresponding to the vertical up state, and the vertical motor 710(3) has a bias (dark circle) corresponding to the vertical down state. These horizontal and vertical positions create an offset gradient profile 2850 with respect to steering the beam, (beam shaping and beam steering), as represented in the phase profile of FIG. 28. FIG. 28 represents a beam at 28 Gigahertz frequency, 30 dBm signal, with a steering angle of $\theta=-5$ degrees, $\phi=45$ degrees.

Figure 29:
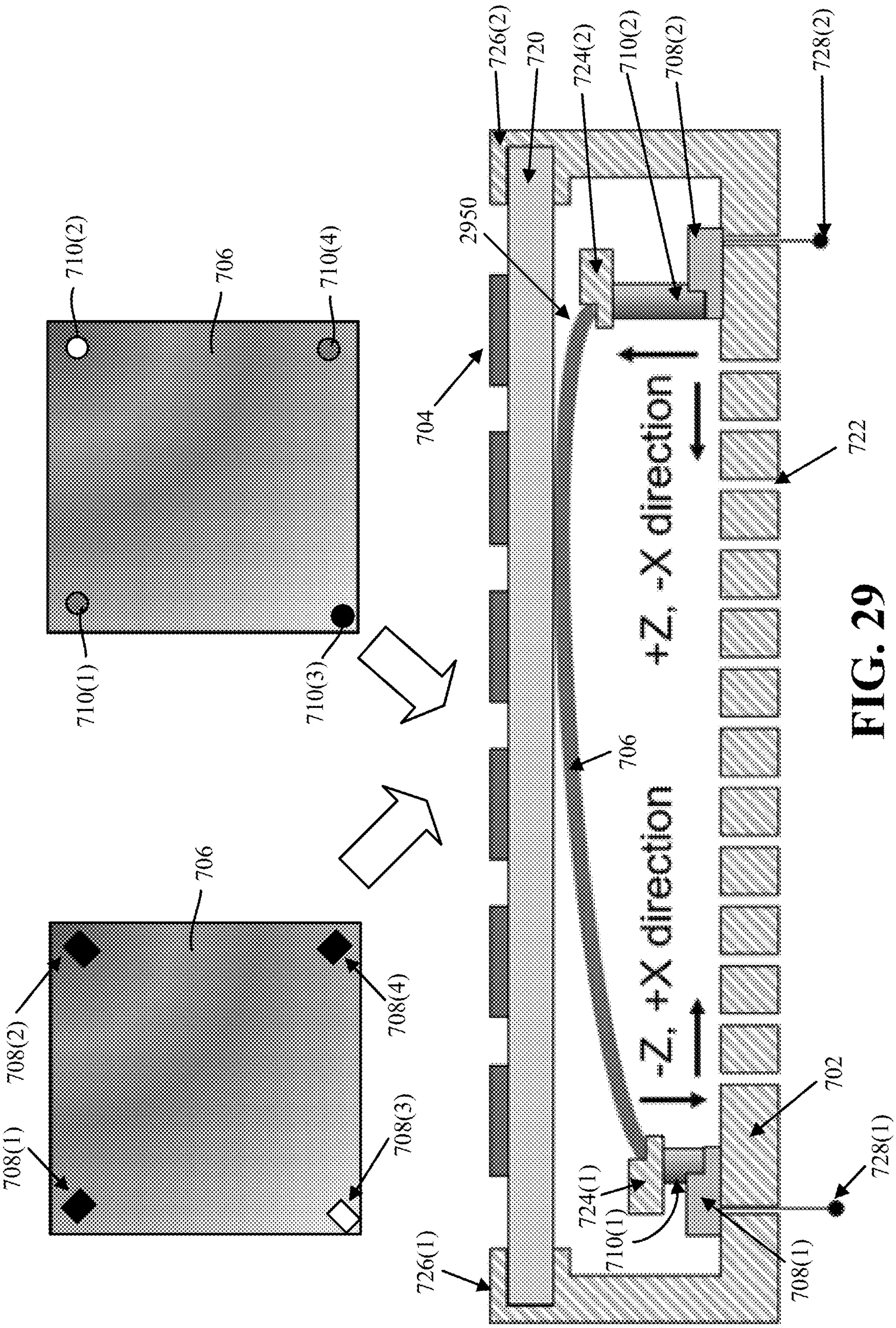
FIG. 29 is a cross-sectional view of the example reconfigurable surface, along with top view representations of the moveable plane, showing how actuating linear actuators and vertical motors create a different curvature in the ground plane (relative to FIG. 27) that results in a different offset gradient profile, in accordance with various example embodiments and implementations of the subject disclosure.
Figure 30:
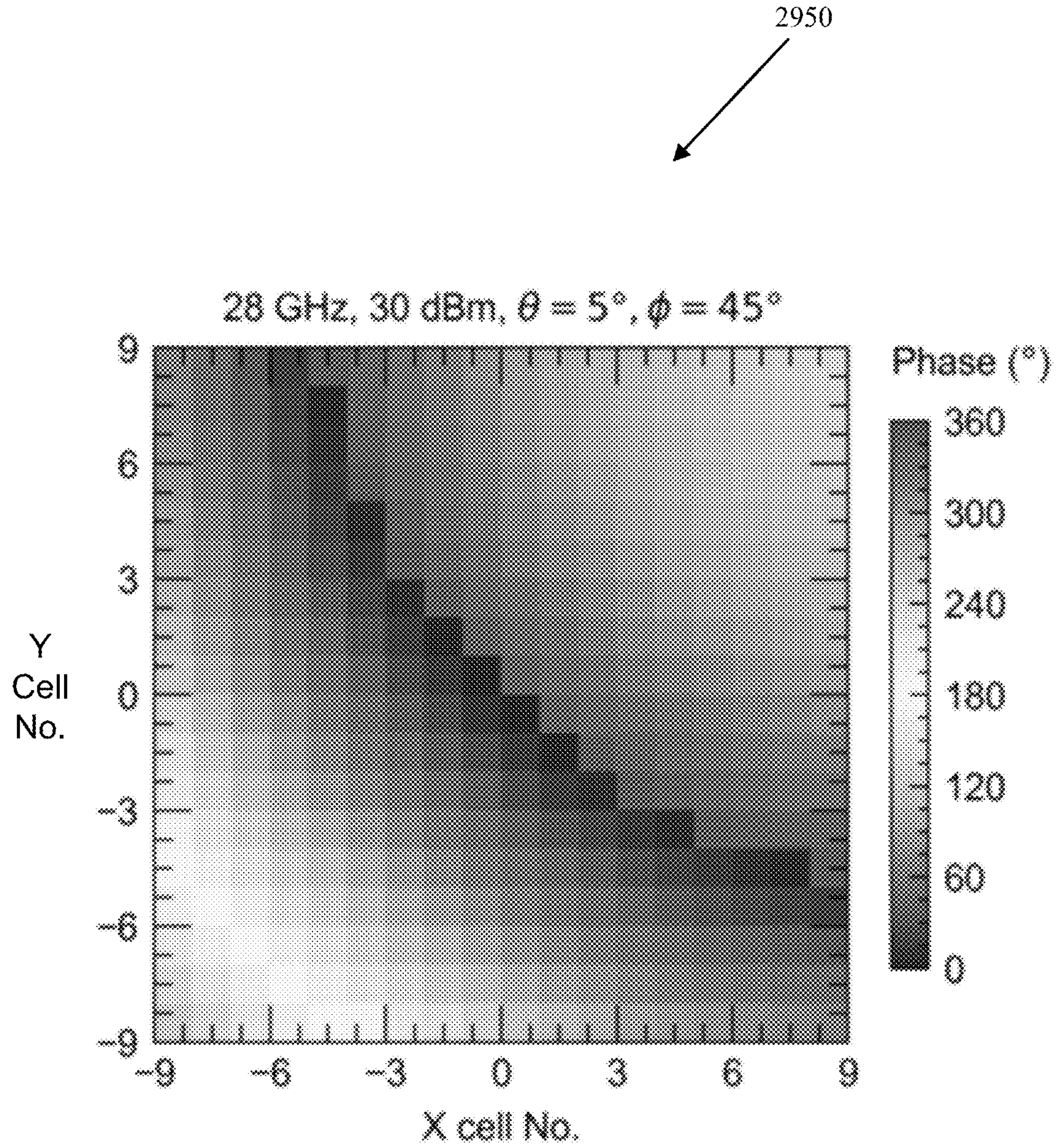
FIG. 30 is an example simulated offset gradient phase profile, corresponding to FIG. 29, of an 18×18 unit-cell reconfigurable surface panel that demonstrates beam shape change with a change of ground plane curvature, in accordance with various example embodiments and implementations of the subject disclosure.

The actuator and motor positions of FIG. 29 create generally the opposite phase profile relative to FIGS. 27 and 28. In FIG. 29, only three of the linear actuators 708(1), 708(2) and 708(4) are driven towards inside of the cavity; the actuator 708(3) is not driven and remains less (or zero) extended towards the center. The vertical motors are actuated as per the rightmost top view profile, namely the vertical motors 710(1) and 710(4) have mid-bias represented by the shaded circles, the vertical motor 710(2) has a bias (dark circle) corresponding to the vertical down state, and the vertical motor 710(3) has a bias (unshaded circle) corresponding to the vertical up state. These horizontal and vertical positions create an offset gradient profile 2950 with respect to steering the beam, (beam shaping and beam steering), as represented in the phase profile of FIG. 30. FIG. 28 represents a beam at 28 Gigahertz frequency, 30 dBm signal, with a steering angle of $\theta=+5$ degrees and $\phi=45$ degrees.

One or more example embodiments can be embodied in a reconfigurable surface, such as described and represented herein. The reconfigurable surface can include respective metallic resonating elements of respective unit cells located at an upper portion of the reconfigurable surface to reflect an electromagnetic signal impinging on the reconfigurable surface as a reflected beam, and a flexible metallic ground plane beneath the respective metallic resonating elements forming respective gaps between respective areas of the flexible ground plane and the respective metallic resonating elements. The reconfigurable surface further can include a first group of actuators controllable to curve the flexible ground plane to change first respective distances corresponding to the respective gaps between the respective areas of the flexible ground plane and the respective resonating metallic elements, and a second group of actuators controllable to move the flexible ground plane vertically to change second respective distances corresponding to the respective gaps between the respective areas of the flexible ground plane and the respective resonating metallic elements. The first respective distances and the second respective distances determine a phase profile of the reconfigurable surface that is usable to determine a shape and steering direction of the reflected beam.

The first group of actuators can be electrically coupled to a controller to controllably curve the flexible ground plane, and/or the second group of actuators can be electrically coupled to the controller to drive the second group of actuators to controllably move the flexible ground plane vertically.

The first respective distances can correspond to a first amount of curvature, the phase profile can be a first phase profile that determines a first shape of the reflected beam, and a controller can drive the first group of actuators to controllably curve the flexible ground plane to change the first amount of curvature to a second amount of curvature to determine a second phase profile of the reconfigurable surface that determines a second shape of the reflected beam.

The second respective distances can correspond to a first tilt angle, the phase profile can be a first phase profile that determines a first steering direction of the reflected beam, and a controller can drive the second group of actuators to controllably tilt the flexible ground plane to change the first phase profile to a second phase profile that determines a second steering direction of the reflected beam.

The flexible ground plane can have four respective corners, the first group of actuators can include four respective linear actuators mechanically coupled to the four respective corners, and the second group of actuators can include four respective motors mechanically coupled to the four respective corners.

The four respective linear actuators can be configured to curve the flexible ground plane by driving the four respective corners towards a center of the reconfigurable surface, and the four respective motors can be configured to move the flexible ground plane vertically by driving the four respective corners in respective vertical amounts relative to the respective metallic resonating elements.

Further embodiments can include a housing that contains the respective metallic resonating elements, the flexible metallic ground plane, the first group of actuators, and the second group of actuators. The housing can include perforations at a lower portion of the housing opposite the upper portion of the reconfigurable surface.

The first group of actuators can include respective linear actuators that are respectively angled relative to the flexible ground plane with respect to respective driving directions of the respective linear actuators. The respective driving directions of the respective linear actuators can be towards a center of the reconfigurable surface and away from the center of the reconfigurable surface.

The respective metallic resonating elements can be arranged as a two-dimensional array at the upper portion of the reconfigurable surface, and the respective metallic resonating elements can be configured to resonate at a frequency corresponding to a frequency of the electromagnetic signal impinging on the reconfigurable surface.

Figure 31:
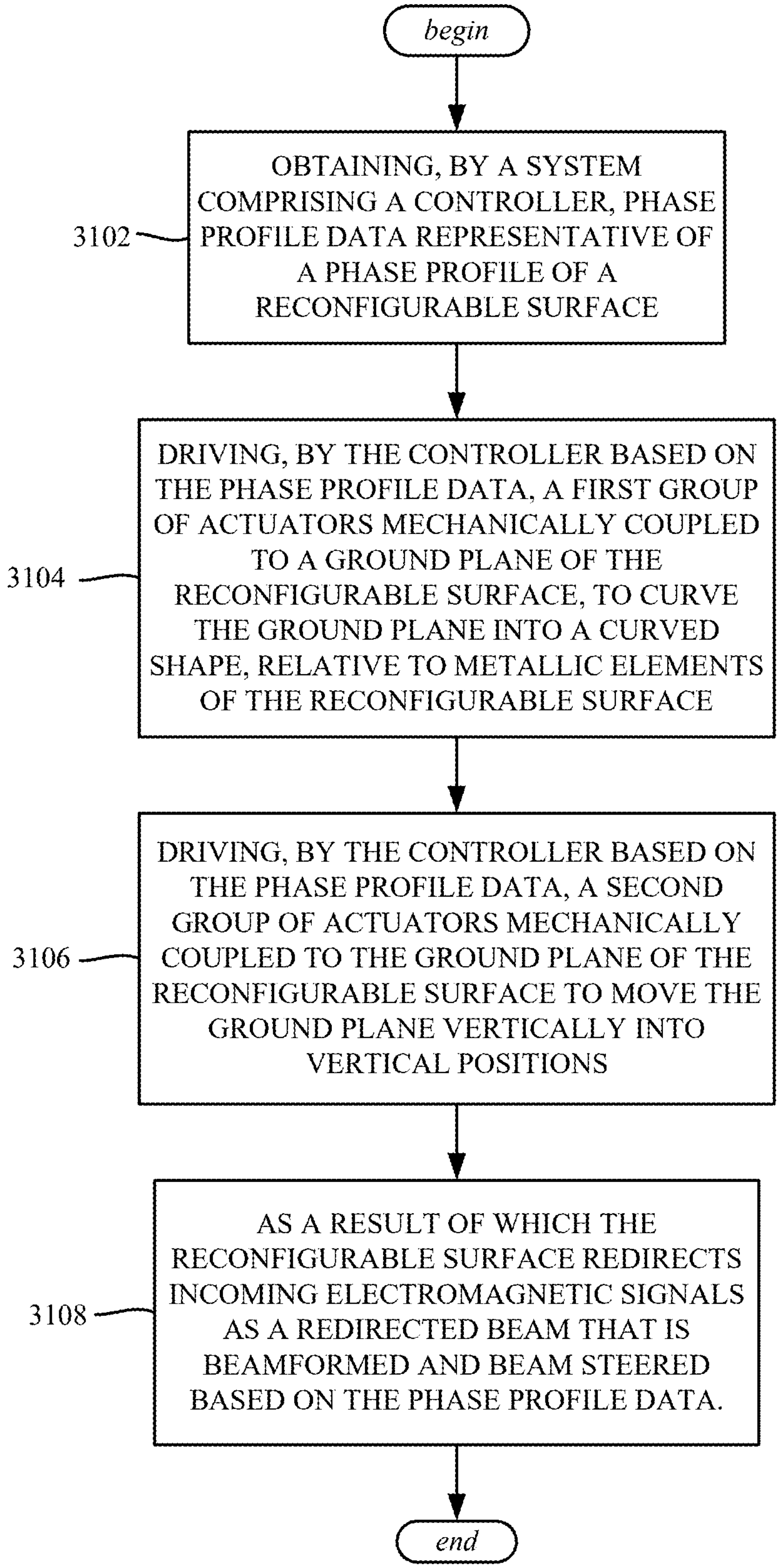
FIG. 31 is a flow diagram showing example operations related to driving groups of actuators to curve and/or vertically move a ground plane based on phase profile data, in accordance with various example embodiments and implementations of the subject disclosure.

One or more example embodiments, such as corresponding to example operations of a method, are represented in FIG. 31. Example operation 3102 represents obtaining, by a system comprising a controller, phase profile data representative of a phase profile of a reconfigurable surface. Example operation 3104 represents driving, by the controller based on the phase profile data, a first group of actuators mechanically coupled to a ground plane of the reconfigurable surface, to curve the ground plane into a curved shape, relative to metallic elements of the reconfigurable surface. Example operation 3106 represents driving, by the controller based on the phase profile data, a second group of actuators mechanically coupled to the ground plane of the reconfigurable surface to move the ground plane vertically into vertical positions. As a result of which (block 3108) the reconfigurable surface redirects incoming electromagnetic signals as a redirected beam that is beamformed and beam steered based on the phase profile data.

The ground plane can include four respective corners, the first group of actuators can include four respective linear actuators mechanically coupled to the four respective corners, the second group of actuators can include four respective motors mechanically coupled to the four respective corners, the driving by the controller of the first group of linear actuators can include controlling the four respective linear actuators to drive the four respective corners towards a center of the reconfigurable surface to curve the ground plane into the curved shape, and the driving by the controller of the second group of actuators can include controlling the four respective motors to drive the four respective corners respective vertical amounts.

The phase profile data can include first phase profile data, the redirected beam can be a first redirected beam that can include a first beam shape and a first beam direction, the curved shape can be a first curved shape, the vertical positions can be first vertical positions, and further operations can include obtaining, by the system, second phase profile data representative of a second phase profile of the reconfigurable surface, and driving, by the controller based on the second phase profile data, the first group of linear actuators to curve the ground plane into a second curved shape, and driving, by the controller based on the second phase profile data, the second group of linear actuators to move the ground plane vertically into second vertical positions, to change the first beam shape and first beam direction of the first redirected beam to a second beam shape and second beam direction of the second redirected beam.

Driving the first group of linear actuators to curve the ground plane can change an average gap between the metallic elements and the ground plane to narrow the second redirected beam relative to the first redirected beam.

Driving the second group of linear actuators can tilt the ground plane to change an average gap between the metallic elements and the ground plane to steer the first beam direction of the first second redirected beam to the second beam direction of the second redirected beam.

One or more example embodiments can be embodied in a system, such as described and represented herein. The system can include respective metallic resonating elements of respective unit cells located at an upper portion of a reconfigurable surface, a flexible metallic ground plane adjacent to the respective metallic resonating elements that forms respective gaps between respective portions of the flexible ground plane and the respective metallic resonating elements, and a controller that mechanically curves the flexible metallic ground plane, and mechanically moves the flexible metallic ground plane vertically, to determine respective distances between the respective portions of the flexible ground plane and the respective resonating metallic elements. The respective distances can determine a shape and direction of a beamformed beam reflected by the reconfigurable surface from an electromagnetic signal impinging on the reconfigurable surface.

Further embodiments can include at least one mechanical actuator mechanically coupled to the flexible metallic ground plane, and at least one mechanical motor coupled to the flexible metallic ground plane that is different from the at least one mechanical actuator; the controller can mechanically curve the flexible metallic ground plane by driving the at least one mechanical actuator mechanically coupled to the flexible metallic ground plane, and the controller can mechanically move the flexible metallic ground plane vertically by driving the at least one mechanical motor mechanically coupled to the flexible metallic ground plane.

The flexible metallic ground plane can include four respective corners, and further can include four respective mechanical actuators mechanically coupled to the four respective corners, and four respective mechanical motors mechanically coupled to the four respective corners that are different from the four mechanical actuators. The controller can mechanically curve the flexible metallic ground plane by driving the four respective mechanical actuators, and the controller can mechanically move the flexible metallic ground plane vertically by driving the four respective mechanicals motors.

The four respective mechanical actuators can be angled relative to the four respective corners to drive the four respective corners towards one another or away from one another, and the four respective mechanical motors can be beneath the four respective corners to drive the four respective corners respective upward or downward vertical distances relative to one another.

As can be seen, the technology described herein is directed to a beam shaping and beam steering device based on mechanical tuning, such as with only four horizontally-oriented linear actuators and four vertically-oriented motors (which also can be linear actuators) per panel, regardless of panel size or number of unit-cells; (this is in contrast to existing mechanisms that have tunable components soldered on each unit-cell, which drives up the cost and fabrication complexity). The technology described herein provides analog-style beam shaping and beam steering capability with only eight set of wires/actuation points per panel instead of quantized states in electronic panels.

As such, an expensive FPGA controller or the like is not needed, as the motors can be controlled using a commercial off-the-shelf microcontroller. This further facilitates low to minimum coding that need only control four actuators, further driving down the software development and debugging costs. The result is low-cost fabrication and no vendor-specific component lock-in requirements.

Indeed, in one implementation, this the technology described herein only is based on having eight movable parts in total to provide analog-style beam shaping and beam steering functionality with only eight set of wires/actuation points per panel, avoiding of complex coding requirements. The actuators can be controlled based on look-up table-based tuning using any of the many suitable commercially available microcontrollers, thus needing only negligible compute complexity requirements with integrated power drivers for the motors. With respect to the motors, there is no static power consumption, as the motors can be driven to a certain stage and a voltage can be taken off to hold the beam state until a different beam state is desired.

Benefits thus include beam reconfigurability with reduced cost of manufacturing by utilizing a flexible metal sheet to create a curvature using linear actuators. Low-cost fabrication along with no vendor-specific component requirements help reduce the cost. Indeed, among other benefits, the reconfigurability device described herein offers a huge cost reduction when compared to currently available electronic beam manipulation solutions. For example, scaling up other solutions increases exponentially with cost as the number of unit cells increases exponentially, e.g., an 8×8 unit cell device needs components (PIN diodes and/or varactors) and soldering for 64 unit cells, a 16×16 unit cell device needs components and soldering for 256 unit cells, a 32×32 unit cell device needs components and soldering for 1024 unit cells, and so on. For example, a 64×64 unit cell device with PIN diodes and/or varactors can cost over $10,000 to construct. If a unit-cell requires more than one PIN diode for more tuning states, the cost further exponentially rises. In contrast, one implementation of the technology described herein operates with four low cost linear actuators and four vertical positioning motors regardless of the number of unit cells, whereby a 64×64 unit cell device based on linear actuators as described herein generally costs less than $1,400 to fabricate.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A reconfigurable surface, comprising:

a substrate;

metallic resonating elements placed on the substrate, wherein respective metallic resonating elements of respective unit cells are located at an upper portion of the reconfigurable surface to reflect an electromagnetic signal impinging on the reconfigurable surface as a reflected beam;

a flexible metallic ground plane beneath the respective metallic resonating elements forming respective gaps between respective areas of the flexible metallic ground plane and the respective metallic resonating elements;

a first group of linear actuators controllable to curve the flexible metallic ground plane to change first respective distances corresponding to the respective gaps between the respective areas of the flexible metallic ground plane and the respective resonating metallic elements; and a second group of linear actuators controllable to move the flexible metallic ground plane vertically to change second respective distances corresponding to the respective gaps between the respective areas of the flexible metallic ground plane and the respective metallic elements, wherein the first respective distances and the second respective distances determine a phase profile of the reconfigurable surface that is usable to determine a shape of the reflected beam, wherein the flexible metallic ground plane comprises four respective corners, wherein the first group of linear actuators comprises four respective first linear actuators mechanically coupled to the four respective corners, and wherein the second group of linear actuators comprise four respective motors mechanically coupled to the four respective corners.

2. The reconfigurable surface of claim 1, wherein the first group of linear actuators is electrically coupled to a controller to drive the first group of linear actuators to controllably curve the flexible metallic ground plane, and wherein the second group of linear actuators is electrically coupled to the controller to drive the second group of linear actuators to controllably move the flexible ground plane vertically.

3. The reconfigurable surface of claim 2, wherein the first respective distances correspond to a first amount of curvature, wherein the phase profile is a first phase profile that determines a first shape of the reflected beam, and wherein the controller drives the first group of linear actuators to controllably curve the flexible metallic ground plane to change the first amount of curvature to a second amount of curvature to determine a second phase profile of the reconfigurable surface that determines a second shape of the reflected beam.

4. The reconfigurable surface of claim 1, wherein the four respective first linear actuators are mechanically coupled to the four respective corners via four respective support anchors.

5. The reconfigurable surface of claim 1, wherein the four respective first linear actuators are configured to curve the flexible metallic ground plane by driving the four respective corners towards a center of the reconfigurable surface, and wherein the four respective motors are configured to move the flexible ground plane vertically by driving the four respective corners in respective vertical amounts relative to the respective metallic resonating elements.

6. The reconfigurable surface of claim 1, further comprising a housing that contains the respective metallic resonating elements, the flexible metallic ground plane, the first group of linear actuators, and the second group of linear actuators.

7. The reconfigurable surface of claim 6, wherein the housing comprises perforations at a lower portion of the housing opposite the upper portion of the reconfigurable surface.

8. The reconfigurable surface of claim 1, wherein the first group of linear actuators comprises respective linear actuators that are respectively angled relative to the flexible metallic ground plane with respect to respective driving directions of the respective linear actuators.

9. The reconfigurable surface of claim 8, wherein the respective driving directions of the respective linear actuators are towards a center of the reconfigurable surface, and away from the center of the reconfigurable surface.

10. The reconfigurable surface of claim 1, wherein the respective metallic resonating elements are arranged as a two-dimensional array at the upper portion of the reconfigurable surface, and wherein the respective metallic resonating elements are configured to resonate at a frequency corresponding to a frequency of the electromagnetic signal impinging on the reconfigurable surface.

11. A method, comprising:

obtaining, by a system comprising a controller, phase profile data representative of a phase profile of a reconfigurable surface;

driving, by the controller based on the phase profile data, a first group of linear actuators mechanically coupled to a ground plane of the reconfigurable surface, the first group of linear actuators curve the ground plane into a curved shape, relative to metallic elements of the reconfigurable surface; and driving, by the controller based on the phase profile data, a second group of actuators mechanically coupled to the ground plane of the reconfigurable surface, the second group of actuators move the ground plane vertically into vertical positions, as a result of which the reconfigurable surface redirects incoming electromagnetic signals as a redirected beam that is beamformed and beam steered based on the phase profile data, wherein the ground plane comprises four respective corners, wherein the first group of linear actuators comprises four respective linear actuators mechanically coupled to the four respective corners, wherein the second group of actuators comprise four respective motors mechanically coupled to the four respective corners, wherein the driving by the controller of the first group of linear actuators comprises controlling the four respective linear actuators to drive the four respective corners towards a center of the reconfigurable surface to curve the ground plane into the curved shape, and wherein the driving by the controller of the second group of actuators comprises controlling the four respective motors to drive the four respective corners respective vertical amounts.

12. The method of claim 11, wherein the phase profile data is first phase profile data, wherein the redirected beam is a first redirected beam comprising a first beam shape and a first beam direction, wherein the curved shape is a first curved shape, wherein the vertical positions are first vertical positions, and wherein the method further comprises:

obtaining, by the system, second phase profile data representative of a second phase profile of the reconfigurable surface;

driving, by the controller based on the second phase profile data, the first group of linear actuators to curve the ground plane into a second curved shape; and driving, by the controller based on the second phase profile data, the second group of linear actuators to move the ground plane vertically into second vertical positions to change the first beam shape and the first beam direction of the first redirected beam to a second beam shape and a second beam direction of the second redirected beam.

13. The method of claim 12, wherein the driving of the first group of linear actuators to curve the ground plane changes an average gap between the metallic elements and the ground plane to narrow the second redirected beam relative to the first redirected beam.

14. The method of claim 12, wherein the driving of the second group of linear actuators tilts the ground plane and changes an average gap between the metallic elements and the ground plane to steer the first beam direction of the first redirected beam to the second beam direction of the second redirected beam.

15. A system, comprising:

a substrate;

metallic resonating elements placed on the substrate, wherein respective metallic resonating elements of respective unit cells are located at an upper portion of a reconfigurable surface;

a flexible metallic ground plane adjacent to the respective metallic resonating elements that forms respective gaps between respective portions of the flexible metallic ground plane and the respective metallic resonating elements; and a controller that mechanically curves the flexible metallic ground plane and mechanically moves the flexible metallic ground plane vertically to determine respective distances between the respective portions of the flexible metallic ground plane and the respective resonating metallic elements, wherein the respective distances determine a shape and a direction of a beamformed beam reflected by the reconfigurable surface from an electromagnetic signal impinging on the reconfigurable surface, wherein the flexible metallic ground plane comprises four respective corners, wherein the system further comprises four respective mechanical actuators mechanically coupled to the four respective corners and four respective mechanical motors mechanically coupled to the four respective corners that are different from the four respective mechanical actuators, wherein the controller mechanically curves the flexible metallic ground plane by driving the four respective mechanicals actuators, and wherein the controller mechanically moves the flexible metallic ground plane vertically by driving the four respective mechanical motors.

16. The system of claim 15, further comprising at least one mechanical actuator mechanically coupled to the flexible metallic ground plane and at least one mechanical motor coupled to the flexible metallic ground plane that is different from the at least one mechanical actuator, wherein the controller mechanically curves the flexible metallic ground plane by driving the at least one mechanical actuator mechanically coupled to the flexible metallic ground plane, and wherein the controller mechanically moves the flexible metallic ground plane vertically by driving the at least one mechanical motor mechanically coupled to the flexible metallic ground plane.

17. The system of claim 15, wherein the four respective mechanicals actuators are angled relative to the four respective corners to drive the four respective corners towards one another or away from one another, and wherein the four respective mechanical motors are beneath the four respective corners and drive the four respective corners respectively upward or downward vertical distances relative to one another.

18. The system of claim 15, further comprising a housing that contains the metallic resonating elements, the flexible metallic ground plane, the four respective mechanical actuators, and the four respective mechanical motors.

19. The system of claim 18, wherein the housing comprises perforations at a lower portion of the housing opposite the upper portion of the reconfigurable surface.

20. The system of claim 19, wherein the perforations are configured to mitigate air damping.

* * * * *